(12) United States Patent
Landon et al.

(10) Patent No.: US 7,417,105 B2
(45) Date of Patent: Aug. 26, 2008

(54) CROSSLINKABLE SILANE-TERMINATED POLYMER AND SEALANT COMPOSITION MADE WITH SAME

(75) Inventors: Shayne J. Landon, Ballston Lake, NY (US); Bruce A. Waldman, Cortland Manor, NY (US)

(73) Assignee: Momentive Performance Materials Inc., Wilton, CT (US)

( * ) Notice: Subject to any disclaimer, the term of this patent is extended or adjusted under 35 U.S.C. 154(b) by 226 days.

(21) Appl. No.: 11/292,045

(22) Filed: Dec. 1, 2005

(65) Prior Publication Data

US 2006/0293480 A1 Dec. 28, 2006

Related U.S. Application Data

(60) Provisional application No. 60/655,976, filed on Feb. 15, 2005.

(51) Int. Cl.
*C08L 75/04* (2006.01)
(52) U.S. Cl. ............ 528/34; 528/25; 528/38; 528/44; 528/85; 556/410; 556/437; 556/464; 556/482
(58) Field of Classification Search .......... None
See application file for complete search history.

(56) References Cited

U.S. PATENT DOCUMENTS

| | | | |
|---|---|---|---|
| 3,278,457 A | 10/1966 | Milgrom | |
| 3,278,458 A | 10/1966 | Belner | |
| 3,278,459 A | 10/1966 | Herold | |
| 3,427,256 A | 2/1969 | Milgrom | |
| 3,427,334 A | 2/1969 | Belner | |
| 3,427,335 A | 2/1969 | Herold | |
| 3,627,722 A | 12/1971 | Seiter | |
| 3,632,557 A | 1/1972 | Brode et al. | |
| 3,829,505 A | 8/1974 | Herold | |
| 3,941,849 A | 3/1976 | Herold | |
| 3,979,344 A | 9/1976 | Bryant et al. | |
| 4,067,844 A | 1/1978 | Barron et al. | |
| 4,222,925 A | 9/1980 | Bryant et al. | |
| 4,345,053 A | 8/1982 | Rizk et al. | |
| 4,355,188 A | 10/1982 | Herold et al. | |
| 4,374,237 A | 2/1983 | Berger et al. | |
| 4,472,560 A | 9/1984 | Kuyper et al. | |
| 4,474,933 A | 10/1984 | Huber et al. | |
| 4,625,012 A | 11/1986 | Rizk et al. | |
| 4,645,816 A | 2/1987 | Pohl et al. | |
| 4,721,818 A | 1/1988 | Harper et al. | |
| 5,364,955 A | 11/1994 | Zwiener et al. | |
| 2005/0245753 A1* | 11/2005 | Cruse et al. | 556/413 |
| 2006/0036034 A1* | 2/2006 | Chaves et al. | 525/100 |

FOREIGN PATENT DOCUMENTS

| | | |
|---|---|---|
| EP | 0 283 148 | 9/1988 |
| EP | 0770633 | 5/1997 |
| GB | 2138013 | 10/1984 |

OTHER PUBLICATIONS

Printout of an anticipatory compound of 20050245753 captured in an STN structure search.*

* cited by examiner

*Primary Examiner*—Marc S Zimmer
(74) *Attorney, Agent, or Firm*—Dominick G. Vicari

(57) ABSTRACT

A crosslinkable silane-terminated polymer is provided which includes the reaction product of an isocyanate-terminated prepolymer and a silane possessing a plurality of hydrolysable sites and at least one active hydrogen-containing group which is reactive for isocyanate, the silane upon hydrolysis produces a reduced amount of volatile organic compound compared to that produced by the hydrolysis of a silane possessing an equivalent number of hydrolyzable sites all of which are hydrolyzable alkoxy groups.

36 Claims, No Drawings

CROSSLINKABLE SILANE-TERMINATED POLYMER AND SEALANT COMPOSITION MADE WITH SAME

CROSS-REFERENCE TO RELATED APPLICATION

The present invention claims priority to U.S. provisional application Ser. No. 60/655,976 filed on Feb. 15, 2005, the contents of which are incorporated by reference herein.

BACKGROUND OF THE INVENTION

Urethane prepolymers have been modified in the past to improve or add to their basic properties by end-capping some or all of the isocyanate groups with various organofunctional silanes. Among these methods, U.S. Pat. No. 3,632,557 teaches the complete end-capping of conventional polyurethane prepolymers with primary and secondary aliphatic aminosilanes. U.S. Pat. No. 3,979,344 details a room temperature curable silicon terminated organic sealant composition comprising a small quantity of 3-(N-2-aminoethyl)aminopropyl-trimethoxysilane end-capper to improve the sealant's cure speed. U.S. Pat. No. 4,222,925 details the same composition as is given in U.S. Pat. No. 3,979,344 but also incorporates a reinforcing carbon black filler. Sealants having improved elongation and flexibility were prepared using silane end-capped polyurethane polymers obtained from silane monomers having at least one dialkoxy group and an organofunctional group with at least one active hydrogen atom in U.S. Pat. No. 4,645,816.

However, polyurethane prepolymers end-capped with primary aminofunctional silanes contain an active hydrogen atom that is capable of further reactions with the isocyanate end groups. This reactivity can lead to undesirable stability of both the polymer and sealant compositions. Several methods teach the use of secondary aminofunctional silane end-cappers. For example, U.S. Pat. No. 4,374,237 teaches the curable isocyanate terminated polyurethane prepolymers of at least part of whose terminal isocyanate groups have been reacted with a secondary amine containing silane monomer having two trialkoxy silane groups. U.S. Pat. No. 4,474,933 describes crosslinkable polyurethane resin mixtures that have been end-capped with various primary and secondary difunctional aminosilanes. More recently, U.S. Pat. No. 5,364,955 teaches the use of N-alkoxysilylalkyl aspartic acid ester end-capped polyurethane prepolymers and sealant compositions made therefrom.

Accordingly, there is a need for a silane-based end-capper to create silylated polyurethane resins that have lower VOC admissions. There is also a need for a silane-based adhesion promoter to create sealants, adhesives and coatings that have lower VOC admissions.

BRIEF DESCRIPTION OF THE INVENTION

In accordance with an embodiment of the present invention, a crosslinkable silane-terminated polymer is provided which comprises the reaction product of an isocyanate-terminated prepolymer and a silane possessing a plurality of hydrolyzable sites and at least one active hydrogen-containing group which is reactive for isocyanate, the silane upon hydrolysis producing a reduced amount of volatile organic compound compared to that produced by the hydrolysis of a silane possessing an equivalent number, per mole, of hydrolyzable sites all of which are hydrolyzable alkoxy groups thereby forming the silane-terminated polymer.

The subject invention also includes compositions, e.g., sealants, coatings and adhesives made with the foregoing crosslinkable silane-terminated polymer.

The expression "volatile organic compound" (VOC) as used herein shall be understood to apply to and designate substantially pure organic compounds that are volatile per EPA (Environmental Protection Agency) method 24 for the United States or do not meet specific criteria established for countries within Europe with respect to vapor pressure or boiling point or are cited as VOCs in European Union Directive 2004/42/EC. Specific examples of such VOCs include methanol, ethanol, propanol, butanol, isopropanol, acetoxysilanes, 2-methoxyethanol, etc.

Various other features, aspects and advantages of the present invention, will become more apparent with reference to the following description and appended claims.

DETAILED DESCRIPTION OF THE INVENTION

A crosslinkable silane-terminated polymer is provided which comprises the reaction product of an isocyanate-terminated prepolymer and a silane possessing a plurality of hydrolyzable sites and at least one active hydrogen-containing group which is reactive for isocyanate, the silane upon hydrolysis producing a reduced amount of volatile organic compound compared to that produced by the hydrolysis of a silane possessing an equivalent number of hydrolyzable sites all of which are hydrolyzable alkoxy groups.

The silane-terminated polymer of this invention can be prepared by reacting about a stiochiometric amount of an isocyanate terminated polyurethane prepolymer with about a stoichiometric amount of a silane compound as described below. Typically, a slight mole excess of the silane compound is used to insure complete reaction of all of the isocyanate terminal groups present on the prepolymer. Normally, the reaction is conducted in the absence of moisture and at temperatures, in a first embodiment, ranging from 0° C. to 150° C. or higher if desired, in a second embodiment in a range of from about 20° C. to 100° C., with mixing to insure good contact between the reactants. Moreover, an inert diluent can be employed to facilitate the reaction if desired. While the reaction is usually conducted at atmospheric pressure, super- or sub-atmospheric pressures can be also used if desired. Optionally, the reaction between the isocyanate prepolymer and the silane can be carried out under anhydrous conditions in an insert atmosphere, such as nitrogen blanket.

The isocyanate-terminated polyurethane prepolymers, useful in the present invention, are prepared by reacting an excess of organic di- or polyisocyanate with a polyol or a combination of polyols usually in the presence of a catalyst. The molar ratio of NCO to OH is typically from about 1.2 to 4.0, depending on the selection of polyols. A summary of the urethane polymer chemistry and technology relevant to the production of such prepolymers can be found in Polyurethanes: Chemistry and Technology, Saunders and Frisch, Interscience Publishers (New York, 1963 (Part I) and 1964 (Part II).

Any suitable organic diisocyanate, either aliphatic, cycloaliphatic, araliphatic, or aromatic, can be used. Suitable organic diisocyanates include meta-phenylene diisocyanate, paraphenylene diisocyanate, diphenylmethane diisocyanate, benzidine diisocyanate, naphthalene-1,5-diisocyanate, hexamethylene diisocyanate, decamethylene diisocyanate, dianisidine diisocyanate, xylylene diisocyanate, bis(2-isocyanatoethyl)fumarate, bis(2-isocyanatoethyl)cyclohex-4-ene-1, bis(2-isocyanatoethyl)carbonate, 2,4-toluene diisocyanate, 2,6-toluene diisocyanate, 4,4' diphenyl-methanediisocyanate, isophorone diisocyanate, dicyclohexymethane-4,4'-diisocyanate, various liquid diphenylmethanediisocyantes containing a mixture of 2,4- and 4,4' isomers, Desmodur N® and the like, and mixtures thereof. Other organic diisocyanates known in the art, such as those disclosed by Siefken, Annalen, 565, 122-135 (1949) can also be used in the invention. According to yet another embodiment of the present invention, an isocyanate functional monomer is a mixture of 2,4- and 4,4' diphenylmethane diisocyanates (MDI), which is available from Bayer under the trade name Mondur® ML.

In producing the isocyanate-terminated polyurethane prepolymers, one or more diols and triols can be employed in the reaction with an organic diisocyanate. Such polyols, in a first embodiment, have a molecular weight ranging from about 250 to about 20,000, in a second embodiment have a molecular weight ranging from about 1000 to about 15,000.

In addition, the polyols can be either polyether or polyester polyols. The polyether polyols with a low degree of unsaturation that can be used in the invention are known in principle and are described, for example, in EP-A 283 148, U.S. Pat. Nos. 3,278,457, 3,278,458, 3,278,459, 3,427,256, 3,427,334, 3,427,335, 3,829,505, 3,941,849, 4,355,188, 4,472,560 and 4,721,818, the contents of which are incorporated by reference herein.

Suitable polyols that can be employed in the preparation of the above mentioned polyurethane prepolymers include polyoxyalkylene diols, polyoxyalkylene triols, polytetramethylene glycols, polycaprolactone diols and triols, and the like.

another embodiment of the present invention, the polyols are polypropylene glycols with equivalent weights ranging from about 500 to about 6000, and all ranges therebetween.

Suitable catalysts that can be used in the preparation of the above mentioned polyurethane prepolymers are typically selected from the group comprising organic bases, carboxylic acids and organometallic compounds including organic titanates and complexes or carboxylates of lead, cobalt, iron, nickel, zinc and tin. Specific examples of the catalyst include dibutyltin dilaurate, dibutyltin diacetate, dibutyltin octanoate, dioctyltin maleate, dibutyltin oxide, stannous octoate, stannous acetate and titanium compounds such as titanium-2-ethylhexoxide. The catalyst can be added, in a first embodiment, in an amount in a range of from about 0.01 to about 1 percent by weight of the total weight of the prepolymer formulation, in a second embodiment in an amount in a range of from about 0.05 to about 0.5 percent by weight of the total weight of the prepolymer formulation, in a third embodiment in an amount of from about 0.1 to 0.2 percent by weight of the total weight of the prepolymer formulation.

Silanes which, upon hydrolysis, produce a reduced quantity of VOC as defined herein and which are therefore useful for preparing the silane-terminated polymer herein include silanes of the general formula:

$$[Y[\text{-}G(\text{-}SiX_u Z^b_v Z^c_w)_s]_r]_n \quad \text{(Formula 1)}$$

wherein each occurrence of G is independently chosen from a set of groups comprising a polyvalent group derived by substitution of one or more hydrogen atoms of an alkyl, alkenyl, aryl or aralkyl group, or a molecular component which can be obtained by removal of one or more hydrogen atoms of a heterocarbon, with G containing from about 1 to about 30 carbon atoms; each occurrence of X is independently selected from the group consisting of —Cl, —Br, $R^1O$—, $R^1C(\!=\!O)O$—, $R^1R^2C\!=\!NO$—, $R^1R^2NO$— or $R^1R^2N$—, —$R^1$, —$(OSiR^1R^2)_t(OSiR^1R^2R^3)$, and —$O(R^{10}CR^{11})_fOH$, —$HN(R^{10}CR^{11})_fNH_2$, —$OOC(R^{10}CR^{11})_fCOOH$, —$O(R^{10}CR^{11})_fNH_2$, —$O(R^{10}CR^{11})_fCOOH$, —$HN(R^{10}CR^{11})_fOH$ wherein each occurrence of $R^1$, $R^2$, $R^3$, $R^{10}$, and $R^{11}$ is independently R; each occurrence of $Z^b$ is independently selected from the group consisting of (—O—)$_{0.5}$, [—$O(R^{10}CR^{11})_fO]_{0.5}$, [—$HN(R^{10}CR^{11})_fN(H)$—]$_{0.5}$, [—$OOC(R^{10}CR^{11})_fCOO$—]$_{0.5}$, [—$O(R^{10}CR^{11})_fN(H)$—]$_{0.5}$ and [—$O(R^{10}CR^{11})_fCOO$—]$_{0.5}$, wherein each occurrence of $R^{10}$ and $R^{11}$ is independently R; each occurrence of $Z^c$ is independently selected from the group consisting of —$O(R^{10}CR^{11})_fO$—, —$HN(R^{10}CR^{11})_fN(H)$—, —$OOC(R^{10}CR^{11})_fCOO$—, —$O(R^{10}CR^{11})_fN(H)$— and —$O(R^{10}CR^{11})_fCOO$—, wherein each occurrence of $R^{10}$ and $R^{11}$ is independently R; each occurrence of R is chosen independently from the set of groups comprising hydrogen; straight, cyclic or branched alkyl groups and may contain unsaturated, alkenyl groups, aryl groups, and aralkyl groups; or molecular components obtained by removal of one or more hydrogen atoms of a heterocarbon; each occurrence of R containing 1 to about 20 carbon atoms; each occurrence of the subscript f is an integer from 1 to about 15, each occurrence of n is an integer from 1 to about 100, with the proviso that when n is greater than 1, v is a greater than 0 and all the valences for $Z^b$ have a silicon atom bonded to them, each occurrence of the subscript u is an integer from 0 to about 3, each occurrence of the subscript v is an integer from 0 to about 3, each occurrence of the subscript w is an integer from 0 to about 1, with the proviso that u+v+2w=3, each occurrence of the subscript r is an integer from 1 to about 6, each occurrence of the subscript t is an integer from 0 to about 50, and each occurrence of the subscript s is an integer from 1 to about 6; and each occurrence of Y is an organofunctional group of valence r; and at least one cyclic and bridging organofunctional silane comprising the cyclic and bridging organofunctional silane composition containing at least one occurrence of $Z^b$ or $Z^c$.

Group Y herein includes univalent organofunctional groups (r=1), divalent organofunctional groups (r=2), trivalent organofunctional groups (r=3), tetravalent organofunctional groups (r=4), as well as organofunctional groups of higher valency, herein referred to as polyvalent organofunctional groups. The term polyvalent organofunctional group herein shall be understood to include univalent, divalent, trivalent, and tetravalent organofunctional groups. According to another embodiment of the present invention, Y in general formula 1 described above is $CH_2\!=\!CH$—, $CHR\!=\!CH$—, or $CR_2\!=\!CH$—.

Another embodiment of the present invention herein includes univalent organofunctional groups such as mercapto and acyloxy groups such as acryloxy, methacryloxy and acetoxy. Another embodiment of the present invention herein includes univalent epoxys such as glycidoxy, —$O$—$CH_2$—$C_2H_3O$; epoxycyclohexylethyl, —$CH_2$—$CH_2$—$C_6H_9O$; epoxycyclohexyl, —$C_6H_9O$; epoxy, —$CR^6(\!-\!O\!-\!)CR^4R^5$. Another embodiment of the present invention herein includes univalent organofunctional groups such as hydroxy, carbamate, —$NR^4C(\!=\!O)OR^5$; urethane, —$OC(\!=\!O)NR^4R^5$; thiocarbamate, —$NR^4C(\!=\!O)SR^5$; thiourethane, —$SC(\!=\!O)NR^4R^5$; thionocarbamate, —$NR^4C(\!=\!S)OR^5$; thionourethane, —$OC(\!=\!S)NR^4R^5$; dithiocarbamate, —$NR^4C(\!=\!S)SR^5$; and dithiourethane, —$SC(\!=\!S)NR^4R^5$. Another embodiment of the present invention herein includes univalent organofunctional groups such as maleimide; maleate and substituted maleate; fumarate and substituted fumarate; nitrile, CN; citraconimide. Another embodiment of the present invention herein includes univalent organofunctional groups such as cyanate, —$OCN$; isocyanate, —$N\!=\!C\!=\!O$; thiocyanate, —$SCN$; isothiocyanate, —$N\!=\!C\!=\!S$; and ether, —$OR^4$. Another embodiment of the present invention herein includes univalent organofunctional groups such as fluoro, —F; chloro, —Cl; bromo, —Br; iodo, —I; and thioether, —SR⁴. Another embodiment of the present invention herein includes univalent organofunctional groups such as disulfide, —S—SR⁴; trisulfide, —S—S—SR⁴; tetrasulfide, —S—S—S—SR⁴; pentasulfide, —S—S—S—S—SR⁴; hexasulfide, —S—S—S—S—S—SR⁴; and polysulfide, —S$_x$R⁴. Another embodiment of the present invention herein includes univalent organofunctional groups such as xanthate, —SC(=S)OR⁴; trithiocarbonate, —SC(=S)SR⁴; dithiocarbonate, —SC(=O)SR⁴; ureido, —NR⁴C(=O)NR⁵R⁶; thionoureido (also better known as thioureido), —NR⁴C(=S)NR⁵R⁶; amide, R⁴C(=O)NR⁵— and —C(=O)NR⁴R⁵—; thionoamide (also better known as thioamide), R⁴C(=S)NR⁴—; univalent melamino; and, univalent cyanurato. Another embodiment of the present invention herein includes univalent organofunctional groups such as primary amino, —NH₂; secondary amino, —NHR⁴; and tertiary amino, —NR⁴R⁵; univalent diamino, —NR⁴-L¹-NR⁵R⁶; univalent triamino, —NR⁴-L¹(-NR⁵R⁶)₂ and —NR⁴-L¹-NR⁵-L²-NR⁶R⁷; and univalent tetraamino, —NR⁴-L¹(—NR⁵R⁶)₃, —NR⁴-L-NR⁵-L²-NR⁶-L³-NR⁷R⁸, and —NR⁴-L¹-N(-L²NR⁵R⁶)₂; wherein each occurrence of L¹, L², and L³ is selected independently from the set of structures given above for G; each occurrence of R⁴, R⁵, R⁶, R⁷ and R⁸ is independently given by one of the structures listed above for R; and each occurrence of the subscript, x, is independently given by x is 1 to 10.

Another embodiment of the present invention herein includes divalent organofunctional groups such as epoxy, -(-)C(—O—)CR⁴R⁵ and —CR⁵(—O—)CR⁴—. Another embodiment of the present invention herein includes divalent organofunctional groups such as carbamate, -(-)NC(=O)OR⁵; urethane, —OC(=O)NR⁴—; thiocarbamate, -(-)NC(=O)SR⁵; thiourethane, —SC(=O)NR⁴—; thionocarbamate, -(-)NC(=S)OR⁵; thionourethane, —OC(=S)NR⁴—; dithiocarbamate, -(-)NC(=S)SR⁵; dithiourethane, —SC(=S)NR⁴—; and ether, —O—. Another embodiment of the present invention herein includes divalent organofunctional groups such as maleate and substituted maleate; fumarate and substituted fumarate. Another embodiment of the present invention herein includes thioether, —S—; disulfide, —S—S—; trisulfide, —S—S—S—; tetrasulfide, —S—S—S—S—; pentasulfide, —S—S—S—S—S—; hexasulfide, —S—S—S—S—S—S—; and polysulfide, —S$_x$—. Another embodiment of the present invention herein includes divalent organofunctional groups such as xanthate, —SC(=S)O—; trithiocarbonate, —SC(=S)S—; dithiocarbonate, —SC(=O)S—; ureido, -(-)NC(=O)NR⁴R⁵ and —NR⁴C(=O)NR⁵—; thionoureido, also better known as thioureido, -(-)NC(=S)NR⁴R⁵ and —NR⁴C(=S)NR⁵—; amide, R⁴C(=O)N(-)- and —C(=O)NR⁴—; thionoamide, also better known as thioamide, R⁴C(=S)N(-)-; divalent melamino; divalent cyanurato. Another embodiment of the present invention herein includes divalent organofunctional groups such as secondary amino, —NH—; tertiary amino, —NR⁴—; divalent diamino, -(-)N-L¹-NR⁴R⁵ and —NR⁴-L¹-NR⁵—; divalent triamino, (—NR⁴)₂-L¹-NR⁵R⁶, -(-)N-L¹-NR⁵-L²-NR⁶R⁷, —NR⁴-L¹-N(-)-L²-NR⁵R⁶, and —NR⁴-L-NR⁵-L²NR⁶—; and divalent tetraamino, -(-)N-L¹-(NR⁵R⁶)₃, (—NR⁴)₂-L¹-(NR⁵R⁶)₂, -(-)N-L¹-NR⁴-L²-NR⁵-L³-NR⁶R⁷, —NR⁴-L¹-N(-)-L²-NR⁵-L³-NR⁶R⁷, —NR⁴-L¹-NR⁵-L²-N(-)-L³-NR⁶R⁷, —NR⁴-L¹-NR⁵-L²-NR⁶-L³-NR⁷—, -(-)N-L¹-N(-L²NR⁵R⁶)₂, and (—NR⁴L¹-)₂N-L²NR⁵R⁶; wherein each occurrence of L¹, L², and L³ is selected independently from the set of structures given above for G; each occurrence of R⁴, R⁵, R⁶, and R⁷ is independently given by one of the structures listed above for R; and each occurrence of the subscript, x, is independently given by x is 1 to 10.

Another embodiment of the present invention herein includes trivalent organofunctional groups such as epoxy, -(-)C(—O—)CR⁴—. Another embodiment of the present invention herein includes trivalent organofunctional groups such as carbamate, -(-)NC(=O)O—; thiocarbamate, -(-)NC(=O)S—; thionocarbamate, -(-)NC(=S)O—; and dithiocarbamate, -(-)NC(=S)S—. ureido, -(-)NC(=O)NR⁴—; thionoureido, also better known as thioureido, -(-)NC(=S)NR⁴—; amide, —C(=O)N(-)-; thionoamide, also better known as thioamide, —C(=S)N(-)-; trivalent melamino; and trivalent cyanurato. Another embodiment of the present invention herein includes trivalent organofunctional groups such as tertiary amino, —N(-)-; trivalent diamino, -(-)N-L¹-NR⁴—; trivalent triamino, (—NR⁴)₃-L¹, (—NR⁴)₂-L¹-NR⁵—, -(-)N-L¹-N(-)-L²-NR³R⁴, —NR⁴-L¹-N(-)-L²-NR⁵—, and -(-)N-L¹-NR⁴-L²-NR⁵—; and trivalent tetraamino, -(-)N-L¹-N(-)-L²-NR⁵-L³-NR³R⁴, —NR⁴-L¹-N(-)-L²-N(-)-L³-NR³R⁴, -(-)N-L¹-NR⁵-L²-N(-)-L³-NR³R⁴, —NR⁴-L¹-N(-)-L²-NR³-L³-NR⁴—, -(-)N-L¹-N(-L²NR³R⁴)(-L²NR⁵—), and (—NR⁴L¹-)₃N; wherein each occurrence of L¹, L², and L³ is selected independently from the set of structures given above for G; and each occurrence of R⁴, R⁵, and R⁶ is independently given by one of the structures listed above for R.

Another embodiment of the present invention herein includes tetravalent organofunctional group such as epoxy, -(-)C(—O—)C(-)-. Another embodiment of the present invention herein includes tetravalent organofunctional groups such as ureido, -(-)NC(=O)N(-)-; thionoureido (also better known as thioureido), -(-)NC(=S)N(-)-; and tetravalent melamino. Another embodiment of the present invention herein includes tetravalent organofunctional groups tetravalent diamino, -(-)N-L¹-N(-)-; tetravalent triamino, (—NR⁴)₄-L¹, (—NR⁴)₂-L¹-N(-)—,-(-)N-L¹-N(-)-L²-NR³—, and -(-)N-L¹-NR⁴-L²(-)-; and tetravalent tetraamino, -(-)N-L¹-N(-)-L²-N(-)-L³-NR⁴R³, —NR⁴-L¹-N(-)-L²-N(-)-L³-NR³—, -(-)N-L¹-NR⁴-L²-NR³-L³-N(-)-, and -(-)N-L¹-N(-L²NR³—)₂; wherein each occurrence of L¹, L², and L³ is selected independently from the set of structures given above for G; and each occurrence of R⁴ and R⁵ is independently given by one of the structures listed above for R.

Another embodiment of the present invention herein includes polyvalent organofunctional groups such as, but is not limited to, polyvalent hydrocarbon groups; pentavalent melamino, —NR³)(—N—)₂C₃N₃; hexavalent melamino, (—N—)₃C₃N₃; pentavalent triamino, -(-)N-L¹-N(-)-L²-N(-)-; pentavalent tetraamino, -(-)N-L¹-N(-)-L²-N(-)-L³-NR³—, -(-)N-L¹-NR³-L²-N(-)-L³-N(-)-, and [-(-)N-L¹-]₂N-L²NR³—; and hexavalent tetraamino, -(-)N-L¹-N(-)-L²-N(-)-L³-N(-)- and [-(-)N-L¹-]₃N; wherein each occurrence of L¹, L², and L³ is selected independently from the set of structures given above for G; and each occurrence of R⁴ is independently given by one of the structures listed above for R.

As used herein, diol, hydrocarbon diol, and difunctional alcohol refer to any structure given by Formula 2:

HO(R¹⁰CR¹¹)$_f$OH (Formula 2)

where f, R¹⁰, and R¹¹ are as defined above. These structures represent hydrocarbons or heterocarbons in which two hydrogen atoms are replaced with OH in accordance with the structures drawn in Formula 2.

As used herein, dialkoxy and difunctional alkoxy refer to any hydrocarbon diol, as defined herein, in which the hydrogen atoms of the two OH groups have been removed to a give divalent radical, and whose structure is given by Formula 3:

$$—O(R^{10}CR^{11})_fO—  \quad\text{(Formula 3)}$$

where in f, $R^{10}$, and $R^{11}$ are as defined above.

As used herein, cyclic dialkoxy refers to a silane or group in which cyclization is about silicon, by two oxygen atoms each attached to a common divalent hydrocarbon or heterocarbon group, such as is commonly found in diols. Cyclic dialkoxy groups herein are represented by $Z^c$.

As used herein, bridging dialkoxy refers to a silane or group in which two different silicon atoms are each bound to one oxygen atom, which is in turn bound to a common divalent hydrocarbon or heterocarbon group as defined herein, such as is commonly found in diols. Bridging dialkoxy groups herein are represented by $Z^b$.

As used herein, cyclic and bridging refers to a silane or group encompassing cyclic only, without bridging; bridging only, without cyclic; and any combination of both cyclic and bridging. Thus, a cyclic and bridging silane could mean, for example, a silane with a silicon atom bound to a cyclic dialkoxy group, a silane with a silicon atom not bound to a cyclic dialkoxy group and bound to bridging dialkoxy group(s) only, a silane with silicon bound to both one end of a bridging dialkoxy group and both ends of a cyclic dialkoxy group, a silane with a silicon atom not bound at all to a dialkoxy group (as long as at least one other silicon atom in the same molecule is bound to at least one cyclic or bridging dialkoxy group), etc.

As used herein, hydrocarbon based diols refer to diols, which contain two OH groups on a hydrocarbon or heterocarbon structure. The term, "hydrocarbon based diol", refers to the fact that the backbone between the two oxygen atoms consists entirely of carbon atoms, carbon-carbon bonds between the carbon atoms, and two carbon-oxygen bonds encompassing the alkoxy ends. The heterocarbons in the structure occur pendent to the carbon backbone.

The structures given by Formula 2 will herein be referred to as the appropriate diol, in a few specific cases, glycol is the more commonly used term, prefixed by the particular hydrocarbon or heterocarbon group associated with the two OH groups. Examples include neopentylglycol, 1,3-butanediol, and 2-methyl-2,4-pentanediol. The groups whose structures are given by Formula 3 will herein be referred to as the appropriate dialkoxy, prefixed by the particular hydrocarbon or heterocarbon group associated with the two OH groups. Thus, for example, the diols, neopentylglycol, 1,3-butanediol, and 2-methyl-2,4-pentanediol correspond herein to the dialkoxy groups, neopentylglycoxy, 1,3-butanedialkoxy, and 2-methyl-2,4-pentanedialkoxy, respectively.

The cyclic and bridging dialkoxy organofunctional silanes used herein, in which the silane is derived from a diol, commonly referred to as a glycol, are correspondingly glycoxysilane. Also, the cyclic and bridging organofunctional dialkoxy silanes used herein, in which the silane is derived from a diol, commonly referred to as a diol, are correspondingly named dialkoxysilane.

As used herein, the notations, $(—O—)_{0.5}$ and $[—O(R^{10}CR^{11})_fO—]_{0.5}$, refer to one half of a siloxane group, Si—O—Si, and one half of a bridging dialkoxy group, respectively. These notations are used in conjunction with a silicon atom and they are taken herein to mean one half of an oxygen atom, namely, the half bound to the particular silicon atom, or to one half of a dialkoxy group, namely, the half bound to the particular silicon atom, respectively. It is understood that the other half of the oxygen atom or dialkoxy group and its bond to silicon occurs somewhere else in the overall molecular structure being described. Thus, the $(—O—)_{0.5}$ siloxane groups and the $[—O(R^{10}CR^{11})_fO—]_{0.5}$ dialkoxy groups mediate the chemical bonds that hold two separate silicon atoms together, whether these two silicon atoms occur intermolecularly or intramolecularly. In the case of $[—O(R^{10}CR^{11})_fO—]_{0.5}$, if the hydrocarbon group, $(R^{10}CR^{11})_f$, is unsymmetrical, either end of $[—O(R^{10}CR^{11})_fO—]_{0.5}$ may be bound to either of the two silicon atoms required to complete the structures given in Formula 1.

As used herein, cyclic chelate refers to a silane or group in which cyclization is about silicon, by two oxygen atoms are each attached to a common divalent hydrocarbon or heterocarbon group, such as is commonly found in diols. Cyclic chelate groups herein are represented by $Z^c$. As used herein, bridging group refers to a silane or group in which two different silicon atoms are each bound to one oxygen atom, which is in turn bound to a common divalent hydrocarbon or heterocarbon group as defined herein, such as is commonly found in diols. Bridging groups herein are represented by $Z^b$.

As used herein, cyclic and bridging refers to a silane or group encompassing cyclic only, without bridging; bridging only, without cyclic; and any combination of both cyclic and bridging. Thus, a cyclic and bridging silane could mean, for example, a silane with a silicon atom bound to a cyclic chelate group, a silane with a silicon atom not bound to a cyclic chelate group and bound to bridging group(s) only, a silane with silicon bound to both one end of a bridging group and both ends of a cyclic chelate group, a silane with a silicon atom not bound at all to a chelate or bridging group (as long as at least one other silicon atom in the same molecule is bound to at least one cyclic or bridging group), etc.

In a similar manner, difunctional amines (as described by Formula 4) and dicarboxycyclicacids (as described by Formula 5) can be substituted for the above difunctional alcohols $$H_2N(R^{10}CR^{11})_fNH_2 \quad\text{(Formula 4)}$$

$$HOOC(R^{10}CR^{11})_fCOOH \quad\text{(Formula 5)}$$

wherein f $R^{10}$, and $R^{11}$ are as defined above in both instances. Representative examples include but are not limited to ethylenediamine, 1,3-diaminopropane and 1,4-diaminobutane in the case of the diamines and succinic acid, adipic acid and hexanoic acid.

Additionally, mixed functionality amines (Formula 6) and acids (Formula 7) are also useful in the present invention.

$$HO(R^{10}CR^{11})_fNH_2 \quad\text{(Formula 6)}$$

$$HO(R^{10}CR^{11})_fCOOH \quad\text{(Formula 7)}$$

With representative examples including but not limited to ethanolamine and glycolic acid, respectively.

As is the case with the difunctional alcohols, from above, the difunctional amines and carboxycyclicacids upon removal of a hydrogen atom from each of the two —$NH_2$ and —COOH groups result in divalent radicals, whose structures are given by Formula 8 and Formula 9, respectively:

$$—HN(R^{10}CR^{11})_fN(H)— \quad\text{(Formula 8)}$$

$$—OOC(R^{10}CR^{11})_fCOO— \quad\text{(Formula 9)}$$

The mixed functionality alkanolamines and hydroxyacids generate similar mixed diradicals after hydrogen abstraction as shown in Formula 10 and 11, respectively:

—O(R$^{10}$CR$^{11}$)$_f$N(H)— (Formula 10)

—O(R$^{10}$CR$^{11}$)$_f$COO— (Formula 11)

As used herein, alkyl includes straight, branched and cyclic alkyl groups; alkenyl includes any straight, branched, or cyclic alkenyl group containing one or more carbon-carbon double bonds, where the point of substitution can be either at a carbon-carbon double bond or elsewhere in the group. Also, alkynyl includes any straight, branched, or cyclic alkynyl group containing one or more carbon-carbon triple bonds and optionally also one or more carbon-carbon double bonds as well, where the point of substitution can be either at a carbon-carbon triple bond, a carbon-carbon double bond, or elsewhere in the group. Specific examples of alkyls include methyl, ethyl, propyl, isobutyl. Specific examples of alkenyls include vinyl, propenyl, allyl, methallyl, ethylidenyl norbornane, ethylidenyl norbornyl, ethylidenyl norbornene and ethylidenyl norbornenyl. Specific examples of alkynyls include acetylenyl, propargyl and methylacetylenyl.

As used herein, aryl includes any aromatic hydrocarbon from which one hydrogen atom has been removed; aralkyl includes any of the aforementioned alkyl groups in which one or more hydrogen atoms have been substituted by the same number of like and/or different aryl (as defined herein) substituents; and arenyl includes any of the aforementioned aryl groups in which one or more hydrogen atoms have been substituted by the same number of like and/or different alkyl (as defined herein) substituents. Specific examples of aryls include phenyl and naphthalenyl. Specific examples of aralkyls include benzyl and phenethyl. Specific examples of arenyls include tolyl and xylyl.

As used herein, cyclic alkyl, cyclic alkenyl and cyclic alkynyl also include bicyclic, tricyclic, and higher cyclic structures, as well as the aforementioned cyclic structures further substituted with alkyl, alkenyl and/or alkynyl groups. Representative examples include norbornyl, norbornenyl, ethylnorbornyl, ethylnorbornenyl, ethylcyclohexyl, ethylcyclohexenyl, cyclohexylcyclohexyl, and cyclododecatrienyl.

As used herein, the term, heterocarbon, refers to any hydrocarbon structure in which the carbon-carbon bonding backbone is interrupted by bonding to atoms of nitrogen and/or oxygen; or in which the carbon-carbon bonding backbone is interrupted by bonding to groups of atoms containing nitrogen and/or oxygen, such as cyanurate ($C_3N_3O_3$). Thus, heterocarbons include, but are not limited to branched, straight-chain, cyclic and/or polycyclic aliphatic hydrocarbons, optionally containing ether functionality via oxygen atoms each of which is bound to two separate carbon atoms, tertiary amine functionality via nitrogen atoms each of which is bound to three separate carbon atoms, melamino groups and/or cyanurate groups; aromatic hydrocarbons; and arenes derived by substitution of the aforementioned aromatics with branched or straight chain alkyl, alkenyl, alkynyl, aryl and/or aralkyl groups.

Representative examples of G include —(CH$_2$)$_m$— wherein m is 1 to 12; diethylene cyclohexane; 1,2,4-triethylene cyclohexane; diethylene benzene; phenylene; —(CH$_2$)$_p$— wherein p is 1 to 20, which represent the terminal straight-chain alkyls further substituted terminally at the other end, such as —CH$_2$—, —CH$_2$CH$_2$—, —CH$_2$CH$_2$CH$_2$—, and —CH$_2$CH$_2$CH$_2$CH$_2$CH$_2$CH$_2$CH$_2$CH$_2$—, and their beta-substituted analogs, such as —CH$_2$(CH$_2$)$_q$CH(CH$_3$)—, where q is zero to 17; —CH$_2$CH$_2$C(CH$_3$)$_2$CH$_2$—; the structure derivable from methallyl chloride, —CH$_2$CH(CH$_3$)CH$_2$—; any of the structures derivable from divinylbenzene, such as —CH$_2$CH$_2$(C$_6$H$_4$)CH$_2$CH$_2$— and —CH$_2$CH$_2$(C$_6$H$_4$)CH(CH$_3$)—, where the notation C$_6$H$_4$ denotes a disubstituted benzene ring; any of the structures derivable from dipropenylbenzene, such as —CH$_2$CH(CH$_3$)(C$_6$H$_4$)CH(CH$_3$)CH$_2$—, where the notation C$_6$H$_4$ denotes a disubstituted benzene ring; any of the structures derivable from butadiene, such as —CH$_2$CH$_2$CH$_2$CH$_2$—, —CH$_2$CH$_2$CH(CH$_3$)—, and —CH$_2$CH(CH$_2$CH$_3$)—; any of the structures derivable from piperylene, such as —CH$_2$CH$_2$CH$_2$CH(CH$_3$)—, —CH$_2$CH$_2$CH(CH$_2$CH$_3$)—, and —CH$_2$CH(CH$_2$CH$_2$CH$_3$)—; any of the structures derivable from isoprene, such as —CH$_2$CH(CH$_3$)CH$_2$CH$_2$—, —CH$_2$CH(CH$_3$)CH(CH$_3$)—, —CH$_2$C(CH$_3$)(CH$_2$CH$_3$)—, —CH$_2$CH$_2$CH(CH$_3$)CH$_2$—, —CH$_2$CH$_2$C(CH$_3$)$_2$— and —CH$_2$CH[CH(CH$_3$)$_2$]—; any of the isomers of —CH$_2$CH$_2$-norbornyl-, —CH$_2$CH$_2$-cyclohexyl-; any of the diradicals obtainable from norbornane, cyclohexane, cyclopentane, tetrahydrodicyclopentadiene, or cyclododecene by loss of two hydrogen atoms; the structures derivable from limonene, —CH$_2$CH(4-methyl-1-C$_6$H$_9$—)CH$_3$, where the notation C$_6$H$_9$ denotes isomers of the trisubstituted cyclohexane ring lacking substitution in the 2 position; any of the monovinyl-containing structures derivable from trivinylcyclohexane, such as —CH$_2$CH$_2$(vinylC$_6$H$_9$)CH$_2$CH$_2$— and —CH$_2$CH$_2$(vinylC$_6$H$_9$)CH(CH$_3$)—, where the notation C$_6$H$_9$ denotes any isomer of the trisubstituted cyclohexane ring; any of the monounsaturated structures derivable from myrcene containing a trisubstituted C=C, such as —CH$_2$CH[CH$_2$CH$_2$CH=C(CH$_3$)$_2$]CH$_2$CH$_2$—, —CH$_2$CH[CH$_2$CH$_2$CH=C(CH$_3$)$_2$]CH(CH$_3$)—, —CH$_2$C[CH$_2$CH$_2$CH=C(CH$_3$)$_2$](CH$_2$CH$_3$)—, —CH$_2$CH$_2$CH[CH$_2$CH$_2$CH=C(CH$_3$)$_2$]CH$_2$—, —CH$_2$CH$_2$(C—)(CH$_3$)[CH$_2$CH$_2$CH=C(CH$_3$)$_2$], and —CH$_2$CH[CH(CH$_3$)[CH$_2$CH$_2$CH=C(CH$_3$)$_2$]]—; and any of the monounsaturated structures derivable from myrcene lacking a trisubstituted C=C, such as —CH$_2$CH(CH=CH$_2$)CH$_2$CH$_2$CH$_2$C(CH$_3$)$_2$—, —CH$_2$CH(CH=CH$_2$)CH$_2$CH$_2$CH[CH(CH$_3$)$_2$]—, —CH$_2$C(=CH—CH$_3$)CH$_2$CH$_2$CH$_2$C(CH$_3$)$_2$—, —CH$_2$C(=CH—CH$_3$)CH$_2$CH$_2$CH[CH(CH$_3$)$_2$]—, —CH$_2$CH$_2$C(=CH$_2$)CH$_2$CH$_2$CH$_2$C(CH$_3$)$_2$—, —CH$_2$CH$_2$C(=CH$_2$)CH$_2$CH$_2$CH[CH(CH$_3$)$_2$]—, —CH$_2$CH=C(CH$_3$)$_2$CH$_2$CH$_2$C(CH$_3$)$_2$—, and —CH$_2$CH=C(CH$_3$)$_2$CH$_2$CH$_2$CH[CH(CH$_3$)$_2$].

Representative examples of R groups are H, branched and straight-chain alkyls of 1 to 20 carbon atoms such as methyl, ethyl, propyl, isopropyl, butyl, octenyl, cyclohexyl, phenyl, benzyl, tolyl, allyl, methoxyethyl, ethoxyethyl dimethylaminoethyl, cyanoethyl, and the like. In another embodiment, representative $R^{10}$ and $R^{11}$ groups are hydrogen, methyl, and ethyl, of which hydrogen and methyl are most preferred. In yet another embodiment, representative $R^1$ and $R^2$ groups can be hydrogen, methyl, ethyl, propyl. In still another embodiment, representative examples of $R^3$, $R^4$, $R^5$, $R^6$, $R^7$, and $R^8$ groups can be H, $C_1$ to $C_4$ straight chain or branched alkyls such as methyl, ethyl, propyl, isopropyl, butyl, isobutyl, pentyl, hexyl, heptyl, octyl, and aryl such as phenyl, benzyl, etc.

Specific examples of X are methoxy, ethoxy, propoxy, isopropoxy, isobutoxy, acetoxy, methoxyethoxy, and oximato, as well as the monovalent alkoxy groups derived from diols, known as "dangling diols", specifically, groups containing an alcohol and an alkoxy, such as —O—CH$_2$CH—OH), such as ethylene glycol, propylene glycol, neopentyl glycol, 1,3-propanediol, 2-methyl-1,3-propanediol, 1,3-butanediol, 2-methyl-2,4-pentanediol, 1,4-butanediol, cyclohexane dimethanol, and pinacol. In another embodiment, specific examples of X are methoxy, acetoxy and ethoxy, as well as the monovalent alkoxy groups derived from the diols, ethylene glycol, propylene glycol, neopentyl glycol, 1,3-propanediol, 2-methyl-1,3-propanediol, 1,3-butanediol, and 2-methyl-2,4-pentanediol.

Specific examples of $Z^b$ and $Z^c$ can be the divalent alkoxy groups derived from diols, such as ethylene glycol, propylene glycol, neopentyl glycol, 1,3-propanediol, 2-methyl-1,3-propanediol, 1,3-butanediol, 2-methyl-2,4-pentanediol, 1,4-butanediol, cyclohexane dimethanol, and pinacol. In another embodiment, specific examples of $Z^b$ and $Z^c$ are the divalent alkoxy groups derived from the diols such as ethylene glycol, propylene glycol, neopentyl glycol, 1,3-propanediol, 2-methyl-1,3-propanediol, 1,3-butanediol, and 2-methyl-2,4-pentanediol are preferred. The divalent alkoxy groups derived from the diols, 1,3-propanediol, 2-methyl-1,3-propanediol, 1,3-butanediol, and 2-methyl-2,4-pentanediol. The bridging ($Z^b$) content of the cyclic and bridging organofunctional silane compositions herein must be kept sufficiently low to prevent excessive average molecular weights and crosslinking, which would lead to gelation.

Additional embodiments are wherein v and w in Formulas 1 can be such that the ratio of w/v is between 1 and 9; X is RO—, RC(=O)O—; $Z^b$ and $Z^c$ can be derived from the diols, 1,3-propanediol, 2-methyl-1,3-propanediol, 1,3-butanediol, 2-methyl-2,4-pentanediol; R is alkyls of $C_1$ to $C_4$ and H; and G is a divalent straight chain alkyl of 2 to 18 carbon atoms. Other embodiments include those wherein w/v is between 2 and 8; X is ethoxy or one or more of the dangling diols derived from the diols, 1,3-propanediol, 2-methyl-1,3-propanediol, 1,3-butanediol, and 2-methyl-2,4-pentanediol; and G is a $C_2$-$C_{12}$ straight-chain alkyl derivative. Another embodiment are wherein v in Formula 1 is 0; X is RO—, RC(=O)O—; R is alkyls of $C_1$ to $C_4$ and H; and G is a divalent straight chain alkyl of 2 to 18 carbon atoms.

Representative examples of the cyclic and bridging organofunctional silanes described in the present invention include:

2-(2-methyl-2,4 pentanedialkoxyethoxysilyl)-1-propyl amine;
2-(2-methyl-2,4-pentanedialkoxyisopropoxysilyl)-1-propyl mercaptan;
2-(2-methyl-2,4-pentanedialkoxymethylsilyl)-1-propyl chloride;
2-(2-methyl-2,4-pentanedialkoxyphenylsilyl)-1-propyl bromide;
3-(1,3-butanedialkoxyethoxysilyl)-1-propyl iodide;
3-(1,3-butanedialkoxyisopropoxysilyl)-1-propyl chloride;
N-[3-(1,3-propanedialkoxyethoxysilyl)-1-propyl]phenylamine;
N-[3-(1,3-propanedialkoxyisopropoxysilyl)-1-propyl]methylamine;
3-(1,2-propanedialkoxyethoxysilyl)-1-propyl glycidyl ether and
3-(1,2-propanedialkoxyisopropoxysilyl)-1-propyl methacrylate, both derivable from propylene glycol; 3-(1,2-ethanedialkoxyethoxysilyl)-1-propyl acrylate and
3-(1,2-ethanedialkoxyisopropoxysilyl)-1-propyl acetate, both derivable from ethylene glycol; 3-(neopentyl glycoxyethoxysilyl)-1-propyl amine and
3-(neopentyl glycoxyisopropoxysilyl)-1-propyl glycidyl ether, both derivable from neopentyl glycol; 3-(2,3-dimethyl-2,3-butanedialkoxyethoxysilyl)-1-propyl acrylate and
3-(2,3-dimethyl-2,3-butanedialkoxyisopropoxysilyl)-1-propyl methacrylate, both derivable from pinacol; 3-(2,2-diethyl-1,3-propanedialkoxyethoxysilyl)-1-propyl mercaptan; S-[3-(2,2-diethyl-1,propanedialkoxyisopropoxysilyl)-1-propyl]ethylthioether;
bis[3-(2-methyl-1,3-propanedialkoxyethoxysilyl)-1-propyl] disulfide;
bis[3-(2-methyl-1,3-propanedialkoxyisopropoxysilyl)-1-propyl]trisulfide;
bis[3-(1,3-butanedialkoxymethylsilyl)-1-propyl]tetrasulfide;
bis[3-(1,3-propanedialkoxymethylsilyl)-1-propyl]thioether;
3-(1,3-propanedialkoxyphenylsilyl)-1-propyl glycidyl thioether;
tris-N,N',N''-[3-(1,2-propanedialkoxymethylsilyl)-1-propyl] melamine and
tris-N,N',N''-[3-(1,2-propanedialkoxyphenylsilyl)-1-propyl] melamine, both derivable from propylene glycol; 3-(1,2-ethanedialkoxymethylsilyl)-1-propyl chloride and
3-(1,2-ethanedialkoxyphenylsilyl)-1-propyl bromide, both derivable from ethylene glycol; 3-(neopentyl glycoxymethylsilyl)-1-propyl acetate and 3-(neopentyl glycoxyphenylsilyl)-1-propyl octanoate, both derivable from neopentyl glycol;
3-(2,3-dimethyl-2,3-butanedialkoxymethylsilyl)-1-propyl amine and
3-(2,3-dimethyl-2,3-butanedialkoxyphenylsilyl)-1-propyl amine, both derivable from pinacol; 3-(2,2-diethyl-1,3-propanedialkoxymethylsilyl)-1-propyl acrylate;
3-(2,2-diethyl-1,3-propanedialkoxyphenylsilyl)-1-propyl methacrylate;
3-(2-methyl-1,3-propanedialkoxyethylsilyl)-1-propyl glycidyl ether;
3-(2-methyl-1,3-propanedialkoxyphenylsilyl)-1-propyl acetate;
2-(2-methyl-2,4-pentanedialkoxyethoxysilyl)-1-ethyl acrylate;
2-(2-methyl-2,4-pentanedialkoxymethoxysilyl)-1-ethyl bromide;
2-(2-methyl-2,4-pentanedialkoxymethylsilyl)-1-ethyl benzenesulfonate;
2-methyl-2,4-pentanedialkoxyethoxysilylmethyl methacrylate;
2-methyl-2,4-pentanedialkoxyisopropoxysilylmethyl bromide; neopentylglycoxypropoxysilylmethyl amine; propyleneglycoxymethylsilylmethyl mercaptan; neopentylglycoxyethylsilylmethyl glycidyl ether;
2-(neopentylglycoxyisopropoxysilyl)-1-ethyl butyrate;
2-(neopentylglycoxy methylsilyl)-1-ethyl propionate;
2-(1,3-butanedialkoxymethylsilyl)-1-ethyl acrylate;
3-(1,3-butanedialkoxyisopropoxysilyl)-4-butyl methacrylate;
3-(1,3-butanedialkoxyethylsilyl)-1-propyl mercaptan;
3-(1,3-butanedialkoxymethylsilyl)-1-propyl methanesulfonate;
6-(2-methyl-2,4-pentanedialkoxyethoxysilyl)-1-hexyl amine;
1-(2-methyl-2,4-pentanedialkoxyethoxysilyl)-5-hexyl acrylat;
8-(2-methyl-2,4-pentanedialkoxyethoxysilyl)-1-octyl methacrylate;
10-(2-methyl-2,4-pentanedialkoxyethoxysilyl)-1-decyl glycidyl ether;
3-(2-methyl-2,4-pentanedialkoxyethoxysilyl)-1-propyl trifluoromethanesulfonate;

3-(2-methyl-2,4-pentanedialkoxypropoxysilyl)-1-propyl amine;
N-[3-(2-methyl-2,4-pentanedialkoxyisopropoxysilyl)-1-propyl]ethylene diamine;
tris-N,N',N''-[3-(2-methyl-2,4-pentanedialkoxybutoxysilyl)-1-propyl]diethylene triamine; tetrakis-N,N',N'',N'''-[3-(2-methyl-2,4-pentanedialkoxyisopropoxysilyl)-1-propyl] triethylene tetramine; bis-(3-(2-methyl-2,4-pentanedialkoxyethoxysilyl)-1-propyl) sulfide;
6-(1,3-butanedialkoxyethoxysilyl)-1-hexyl amine;
1-(1,3-butanedialkoxyethoxysilyl)-5-hexyl glycidyl ether;
8-(1,3-butanedialkoxyethoxysilyl)-1-octyl acrylate;
10-(1,3-butanedialkoxyethoxysilyl)-1-decyl methacrylate;
bis-(3-(2-methyl-2,4-pentanedialkoxyethoxysilyl)-1-propyl) thioether;
[HN($CH_2CH_3$)$CH_2CH(CH_3)CH_2Si(OCH_3)$ ($HNCH_2CH_2NH$)];
[[HN($CH_2CH_3$)$CH_2CH(CH_3)$ $CH_2Si(OCH_3)_2]_2$ ($HNCH_2CH_2NH$)];
[HN($CH_2CH_3$)$CH_2CH(CH_3)CH_2Si(OCH_3)$ ($HNCH_2CH_2CH_2NH$)];
[[HN($CH_2CH_3$)$CH_2CH(CH_3)$ $CH_2Si(OCH_3)_2]_2$ (HNCH2CH2$CH_2NH$)];
[$H_2NCH_2CH_2CH_2Si(OCH_3)$($HNCH_2CH_2NH$)];
[HS $CH_2CH_2CH_2Si(OCH_3)$($HNCH_2CH_2NH$)];
[$H_2NCH_2CH_2NHCH_2CH_2CH_2Si(OCH_3)$ ($HNCH_2CH_2NH$)];
[[$H_2NCH_2CH_2NHCH_2CH_2CH_2Si(OCH_3)_2]_2$ ($HNCH_2CH_2NH$)];
[HN($CH_2CH_3$)$CH_2CH(CH_2)CH_2Si(OCH_3)$ ($O_2CCH_2CH_2CO_2$)];
[$H_2NCH_2CH_2CH_2Si(OCH_3)$($O_2CCH_2CH_2CO_2$)];
[[$H_2NCH_2CH_2CH_2Si(OCH_3)_2]_2$($O_2CCH_2CH_2CO_2$)];
[$H_2N CH_2CH_2CH_2 Si(OCH_2CH_3)$($O_2CCH_2CH_2CO_2$)];
[HN($C_6H_5$)$CH_2CH_2CH_2Si(OCH_3)$($O_2CCH_2CH_2CO_2$)];
[$CH_2$=C($CH_3$)$CO_2CH_2CH_2CH_2Si(OCH_3)$ ($O_2CCH_2CH_2CO_2$)];
[[$CH_2$=C($CH_3$)$CO_2CH_2CH_2CH_2Si(OCH_3)_2]_2$ ($O_2CCH_2CH_2CO_2$)];
[$CH_2$=C($CH_3$)$CO_2CH_2CH_2CH_2$ Si($OCH_3$) ($HNCH_2CH_2NH$)];
[($CH_2CH_2O$)$CH_2CH_2OCH_2CH_2CH_2Si(OCH_3)$ ($O_2CCH_2CH_2CO_2$)];
[$H_2NC(O)HNCH_2CH_2CH_2Si(OCH_3)$ ($HNCH_2CH_2NH$)];
[$H_2NC(O)HNCH_2CH_2CH_2Si(OCH_3)$($O_2CCH_2CH_2CO_2$)];
[[$H_2NC(O)HNCH_2CH_2CH_2Si(OCH_3)_2]_2$ ($O_2CCH_2CH_2CO_2$)];
[HN($CH_2CH_3$)$CH_2CH(CH_2)CH_2Si(OCH_3)$ ($HNCH_2CH_2O$)];
[$H_2NCH_2CH_2CH_2Si(OCH_3)$($HNCH_2CH_2O$)];
[[HN($C_6H_5$)$CH_2CH_2CH_2Si(OCH_3)_2]_2$($HNCH_2CH_2O$)];
[($CH_2CH_2O$)$CH_2CH_2OCH_2CH_2CH_2Si(OCH_3)$ ($HNCH_2CH_2O$)]; and,
[[$H_2NCH_2CH_2CH_2Si(OCH_3)_2]_2$($HNCH_2CH_2O$).

In another embodiment, the cyclic organofunctional silanes are cyclic and bridging analogs to the 3-chloro-1-propyltriethoxysilane(3-triethoxysilyl-1-propyl chloride), used as a starting point for the manufacture of silane coupling agents as, for example, polysulfide silanes, such as triethoxysilylpropyl tetrasulfide referred to herein as TESPT, triethoxysilylpropyl disulfide referred to herein as TESPD. The cyclic and bridging haloalkyl silanes are novel and excellent alternatives to 3-triethoxysilyl-1-propyl chloride for use where reduced VOC emissions are desired.

The cyclic and bridging organofunctional silane compositions included herein may comprise single components or various mixtures of individual cyclic and bridging organofunctional silane components, organofunctional silane components, which contain only monofunctional alkoxy groups, and optionally including other species as well. Synthetic methods result in a distribution of various silanes, wherein mixtures of the starting components are employed for the purpose of generating mixtures of cyclic and bridging organofunctional silane products. Moreover, it is understood that the partial hydrolyzates and/or condensates of these cyclic and bridging organofunctional silanes, also referred to as cyclic and bridging organofunctional siloxanes and/or silanols, may be encompassed by the silanes herein as a side product of most methods of manufacture of the cyclic and bridging organofunctional silanes. Also, the partial hydrolyzates and/or condensates can occur upon storage of the cyclic and bridging organofunctional silanes, especially in humid conditions, or under conditions in which residual water remaining from their preparation is not completely removed subsequent to their preparation. Furthermore, partial to substantial hydrolysis of the cyclic and bridging organofunctional silanes may be deliberately prepared by incorporating the appropriate stoichiometry or excess of water into the methods of preparation described herein for the silanes. Also, the siloxane content of the cyclic and bridging organofunctional silanes may be deliberately prepared by incorporating the appropriate stoichiometry or excess of water into the methods of preparation for the silanes described herein. Silane structures herein encompassing hydrolyzates and siloxanes are described in the structures given in Formula 1 wherein the subscrips, V, of $Z^b$=(—O—)$_{0.5}$ and/or u, of X=OH can be substantive, meaning substantially larger than zero.

In another embodiment of the present invention, the cyclic and bridged organofunctional silanes comprising secondary amines and/or mercapto groups produce a polymer having greater elasticity. In other words, the organofunctional silanes comprising a secondary amine and/or mercapto group produce a polymer having a lower crosslinkable density than a conventional silane comprising a primary amino.

The silane compounds with heterocyclic silicon groups included herein may be prepared by transesterification of organofunctional alkoxy-substituted silanes and diols with or without a catalyst, by the esterification of organofunctional silyl halides with diols, or by the hydrosilylation of substituted alkenes with a hydrosilane containing a heterocylic silicon group to generate cyclic and bridging silane compositions.

The transesterification of organofunctional alkoxy-substituted silanes and diols may be conducted with or without a catalyst. The catalyst may be an acid, a base or a transition metal catalyst. Suitable acid catalysts are hydrochloric acid, p-toluenesulfonic acid and the like. Typical base catalysts are sodium methoxide, sodium ethoxide. Suitable transition metal catalysts are tetraisopropyl titanate, dibutyltin dilaurate.

During esterification of organofunctional silyl halides with diols, diols are added to the silyl halide with removal of the hydrogen halide formed. The hydrogen halide may be removed by sparging with nitrogen or by using reduced pressure. Any remaining halo groups can be removed by the addition of an alcohol such as methanol, ethanol, isopropanol, and the like.

In another embodiment of the present invention, the diol-derived organofunctional silane can be prepared by reacting a catalyzed mixture of organofunctional silane reactant and diol with simultaneous distillation. The reaction leads to the alcohol exchange of one or more of the alkoxy groups selectively at the silicon atom of the organofunctioal silane reactant with the diol. The reaction is driven by the removal of the more volatile by-product alcohol by distillation. Suitable catalysts include acids such as p-toluenesulfonic acid, sulfuric acid, hydrochloric acid, chlorosilanes, chloroacetic acids, phosphoric acid, their mixtures, and so forth; bases such as sodium ethoxide; and, transition metal-containing catalyts such as titanium alkoxides, titanium-containing chelates, zirconium alkoxides, zirconium-containing chelates and mixtures thereof.

In yet another embodiment of the present invention, the diol-derived organofunctional silane can be prepared by catalyzing a mixture of organofunctional silane and diol, in an embodiment of the present invention, at a molar ratio of at least about 0.5 moles of diol per alkoxy-silyl group to be transesterified. According to another embodiment of the present invention, the molar ratio is at about 0.5 to about 1.5 for a trialkoxy silane. According to yet another embodiment of the present invention, the molar ratio is about 1.0 to about 1.5 for a trialkoxy silane. In each of the foregoing embodiments, the reaction temperature can range from about 10° C. to about 150° C. and in another embodiment from about 30° C. to 90° C. while maintaining a pressure in the range of from about 0.1 to about 2000 mm Hg absolute, and in another embodiment, from about 1 to about 80 mm Hg absolute. Excess diol can be utilized to increase reaction rate.

In another embodiment the diol-derived organofunctional silane can be prepared by slowly adding diol to organofunctional silane in the presence of catalyst at the desired reaction temperature and under vacuum. If desired, a neutralization step may be utilized to neutralize any acid or base catalyst that may have been utilized thereby improving product storage.

Optionally, an inert solvent may be used in the process. The solvent may serve as a diluent, carrier, stabilizer, refluxing aid or heating agent. Generally, any inert solvent, i.e., one which does not enter into the reaction or adversely affect the reaction, may be used. In one embodiment, solvents are those which are liquid under normal conditions and have a boiling point below about 150° C. Examples include aromatics, hydrocarbons, ethers, aprotic solvents and chlorinated hydrocarbon solvents such as, toluene, xylene, hexane, butane, diethyl ether, dimethylformamide, dimethyl sulfoxide, carbon tetrachloride, methylene chloride, and so forth.

The silanes of Formula 1 obtained with difunctional reactants of Formulas 4-11 can be prepared by procedures analogous to those described above for the diol reactants of Formulas 2 and 3.

In another embodiment of the present invention, the diol-derived organofunctional silane can be prepared by continuously premixing the flow-streams of organofunctional silane reactant, diol, and catalyst (when employed) at appropriate ratios and then introducing the premixed reactants into a reactive distillation system, in one embodiment, a thin film distillation device operating at the desired reaction temperature and vacuum conditions. Conducting the reaction in a thin film under vacuum accelerates the removal of the alcohol by-product and improves the transesterification reaction rate. The vaporization and removal of the by-product alcohol from the film shifts the chemical equilibrium of the reaction to favor formation of the desired product and minimizes undesired side reactions.

The foregoing embodiment of the process herein comprises the steps of:

a) reacting, in a thin film reactor, a thin film reaction medium comprising organofunctional silane, e.g., a thiocarboxylate silane, diol and catalyst to provide diol-derived organofunctional silane and by-product alcohol;

b) vaporizing the by-product alcohol from the thin film to drive the reaction;

c) recovering the diol-derived organofunctional silane reaction product;

d) optionally, recovering the by-product alcohol by condensation; and, e) optionally, neutralizing the diol-derived organofunctional silane product to improve its storage stability.

The molar ratio of diol to organofunctional silane reactant used in the foregoing continuous thin film process will depend upon the number of alkoxy groups that are desired to be replaced with diol. In one embodiment of the thin film process, a stoichiometric equivalent molar ratio of 1 is used wherein one diol replaces two alkoxy groups. Generally, for the practice of this embodiment, the molar ratio of diol to organofunctional silane can be varied within a range of from about 95 to about 125 percent of stoichiometric equivalence for each alkoxy-silyl group to be transesterified. In a particular embodiment, the molar ratio of diol to organofunctional silane can be within the range of from about 100 to about 110 percent of stoichiometric equivalence. In another embodiment, the molar ratio can be within a range of from about 100 to about 105 percent of stoichiometric equivalence for the molar ratio of diol to organofunctional silane. Those skilled in the art will recognize that excess diol could be utilized to increase reaction rates but such is ordinarily of no significant advantage when conducting the reaction in a thin film and only adds to the expense.

The apparatus and method of forming the film are not critical and can be any of those known in the art. Typical known devices include falling film or wiped film evaporators. Minimum film thickness and flow rates will depend on the minimum wetting rate for the film forming surface. Maximum film thickness and flow rates will depend on the flooding point for the film and apparatus. Vaporization of the alcohol from the film is effected by heating the film, by reducing pressure over the film or by a combination of both. It is preferred that mild heating and reduced pressure are utilized to form the diol-derived organofunctional silane of this invention. Optimal temperatures and pressures (vacuum) for running the thin film process will depend upon the specific starting organofunctional silane's alkoxy groups and diol used in the process.

The silanes herein provide significant advantages over traditional coupling agents, adhesion promoters and crosslinking agents, which have found extensive use in the known art. These cyclic and bridging organofunctional silane compositions reduce the amount of volatile components that are generated during use. The volatile components are safety hazards and pollute the environment. The traditional coupling agents include, for example, amino silanes such as Silquest® A-1110 from GE. This contains in its molecular structures three methoxy groups on each silicon atom, which results in the release of up to three moles of methanol for each silane silicon equivalent during curing of a sealant formulation in which the silane silicon acts to enhance adhesion between the sealant composition and a substrate. The release of methanol is a great disadvantage because it is flammable and therefore poses a threat of fire, and because it contributes so greatly to VOC emissions and is therefore potentially harmful to the environment. The modified organofunctional silane compositions described herein eliminate or greatly mitigate this problem by capping the methanol emissions to only one, less than one, or even essentially zero moles of methanol per silane equivalent.

In accordance with an exemplary embodiment of the present invention, a process for the preparation of a silane composition is provided comprising reacting at least one organofunctional silane with a diol in the presence or absence of catalyst to provide a diol-derived organofunctional silane.

The cyclic and bridging organofunctional silane compositions included herein may comprise single components or various mixtures of individual cyclic and bridging organofunctional silane components, organofunctional silane components, which contain only monofunctional groups, and optionally including other species as well. Synthetic methods result in a distribution of various silanes, wherein mixtures of the starting components are employed for the purpose of generating mixtures of cyclic and bridging dialkoxy organofunctional silane products. Moreover, it is understood that the partial hydrolyzates and/or condensates of these cyclic and bridging organofunctional silanes, also referred to as cyclic and bridging organofunctional siloxanes and/or silanols, may be encompassed by the silanes herein as a side product of most methods of manufacture of the cyclic and bridging organofunctional silanes. Also, the partial hydrolyzates and/or condensates can occur upon storage of the cyclic and bridging organofunctional silanes, especially in humid conditions, or under conditions in which residual water remaining from their preparation is not completely removed subsequent to their preparation. Furthermore, partial to substantial hydrolysis of the cyclic and bridging organofunctional silanes may be deliberately prepared by incorporating the appropriate stoichiometry or excess of water into the methods of preparation described herein for the silanes. Also, the siloxane content of the cyclic and bridging organofunctional silanes may be deliberately prepared by incorporating the appropriate stoichiometry or excess of water into the methods of preparation for the silanes described herein.

According to another embodiment of the present invention, any of the organofunctional silanes having an amino and/or mercapto functional group can react with an isocyanate-terminated polyurethane prepolymer useful in the formation of a silylated urethane polymer where the amino and/or mercapto functional group react with the isocyanate group of the prepolymer to form the silylated urethane polymer having reduced VOC performance.

Sealant compositions can be obtained from the above silane-terminated polyurethane polymers by thoroughly mixing together the silane-terminated polyurethane polymer described above, a cure catalyst, and one or more conventional functional adjuvants such as fillers, plasticizers, thixotropes, antioxidants, U.V. stabilizers and adhesion promoter(s). Effective mixing of the various components can be achieved using a double planetary mixer (batch approach). However, the sealant can also be manufactured using a continuous process. Typically, the silane-terminated polyurethane polymer, fillers, stabilizers and plasticizers are mixed at about 60° C. for about 60 to about 90 minutes. After cooling to about 50° C., the desired silane adhesion promoter, dehydrating agent and cure catalyst are added and the mixture is stirred for about 30 minutes.

Suitable silanes are the same as the silanes described herein above.

The fillers include ground, precipitated and colloidal calcium carbonates which are treated with compounds such as stearate or stearic acid; reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black and graphite or clays such as kaolin, bentonite or montmorillonite for example. These fillers can be used alone or in combination. The fillers can, in a first embodiment, comprise up to 200 parts per 100 parts of the silane-terminated polymer, in a second embodiment about 80 to about 150 parts of the silane-terminated polymer, and in a third embodiment about 100 parts of the silane-terminated polymer.

The plasticizers typically employed in this field are suitable for use in the present invention to increase elongation to facilitate use of a higher filler levels. Exemplary plasticizers include phthalates, dipropylene and diethylene glycol dibenzoates and mixtures thereof, epoxidized soybean oil and the like. Useful sources of dioctyl and diisodecylphthalate may include those available under the trade names Jayflex® DOP and Jayflex® DIDP from ExxonMobil Chemical. The dibenzoates are available as Benxoflex® 9-88, Benxoflex® 400 from Velsicol Chemical Corporation. The plasticizer is typically present, in a first embodiment, in an amount up to about 100 parts per 100 parts of the silane-terminated polyurethane polymer, in a second embodiment in an amount of about 40 to about 80 parts per 100 parts of the silane-terminated polyurethane polymer.

The sealant compositions of the present invention typically incorporate U.V. and/or antioxidants, in a first embodiment, in an amount ranging from about 0 to about 5 parts per 100 parts silane-terminated polyurethane polymer, in a second embodiment, in an amount ranging from about 0.5 to about 2.0 parts per 100 parts silane-terminated polyurethane polymer. Representative additives include but are not limited to Tinuvin® 770, Tinuvin® 327, Tinuvin® 213, Tinuvin® 622 and Irganox® 1010. These stabilizers can be used alone or in combination.

Suitable cure catalysts are the same as the catalysts described above for the preparation of the polyurethane prepolymers. In accordance with another embodiment of the present invention, the cure catalyst can be a metal catalyst selected from the group consisting of tin or titanium.

The various thixotropic or anti-sagging agents, include various castor waxes, fumed silica, treated clays and polyamides. These additives typically comprise about 1 to about 10 parts per hundred parts of the silylated urethane component. According to another embodiment of the present invention, these additives comprise about 1 to about 6 parts per hundred parts of the silylated urethane component. The thixotrope includes those available as: Aerosil® from Degussa, Cab-O-Sil® TS 720 from Cabot, Castorwax® from CasChem, Thixatrol® and Thixcin® from Rheox and Disparlon® from King Industries.

According to another embodiment of the present invention, after mixing, the sealants may be cured at about 23° C. and at about 50% relative humidity for 3 days and at about 37° C. and at about 95% relative humidity for another 4 days. The physical properties of the cured sealant are then determined by tensile, tear and elongation tests using American Society for Testing and Materials (ASTM) Methods D 412 and D 624.

The polymers of this invention vulcanize or cure into a cross-linked, three-dimensional network upon exposure to moisture (water vapor, liquid water, aqueous systems, etc.). The cure rate is dependent on atmospheric temperature, relative humidity, and the like. According to another embodiment of the present invention, the polymer is employed in the form of a sealant composition comprising the polymer and a catalyst to facilitate the crosslinking, or vulcanization, of the polymer. These compositions form part of this invention.

The silanes of the present invention are also useful as adhesion promoters for the sealant compositions in which the ability to adhere to another surface is highly desirable. In this application the silane is typically added during the later stages of the compounding of the sealant or adhesive compositions.

These materials are typically employed, in a first embodiment, at levels of about 0.25 to about 5 by weight percent of the composition, in a second embodiment at levels of about 0.50 to about 2.5 weight percent of the composition, in a third embodiment at 0.8 to 1.5 weight percent of the composition. In addition to the silanes of the present invention, suitable adhesion promoters may include, but are not limited to Silquest® A-1120 silane, Silquest® A-2120 silane, Silquest® A-1170 silane and Silquest® A-187 silane available from General Electric Company.

In accordance with another exemplary embodiment of the present invention, a sealant composition is provided which comprises a silane adhesion promoter which upon hydrolysis produces a reduced amount of volatile organic compound compared to that produced by the hydrolysis of a silane possessing an equivalent number of hydrolyzable sites all of which are hydrolyzable alkoxy groups, and one or more optional ingredients selected from the group consisting of thixotropic agent, plasticizer, stabilizer, pigment and filler.

In accordance with yet another exemplary embodiment of the present invention, a sealant composition is provided which comprises a silylated polyurethane resin, a catalyst, a silane adhesion promoter which upon hydrolysis produces a reduced amount of volatile organic compound compared to that produced by the hydrolysis of a silane possessing an equivalent number of hydrolyzable sites all of which are hydrolyzable alkoxy groups, and one or more optional ingredients selected from the group consisting of thixotropic agent, plasticizer, stabilizer, pigment and filler.

The crosslinkable, or vulcanizable, silane-terminated polymers of this invention are useful in coating applications and in caulking and sealing applications on buildings, airplanes, bathroom fixtures, automotive equipment or wherever elastomeric polymers with improved elongation and flexibility are desired. Another desirable feature of these crosslinkable polymers is their ability to be applied to moist or wet surfaces and be cured into a cross-linked elastomer without deleterious effects, which cured product becomes tack-free within a relatively short period of time. Moreover, the cured polymers of this invention strongly adhere alone or with the aid of a primer to a wide variety of substrates such as glass, porcelain, wood, metals, polymeric materials and the like making them especially suited for any type of caulking, adhesive or laminating application.

The cured polymers of this invention provide a combination of the desirable properties of hydrocarbyloxysilane-terminated polyurethane polymers such as tear resistance, extensibility, elastic recovery, and the like, while at the same time providing the desirable properties of improved elongation and flexibility and lower modulus of elasticity. Improved elongation and lower modulus of elasticity, e.g., can significantly reduce the stresses on polyurethane sealants at the interface of the substrate during expansions and contractions of joints. These properties help to minimize adhesive failure of the sealants.

While the invention has been described with reference to a number of embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to any particular embodiment disclosed herein.

The following nonrestrictive examples are further illustrative of the invention.

EXAMPLE 1

This examples illustrates the preparation of an organofunctional silane (designated as Silane A) which will later be used as an endcapper in the production of a silylated polyurethane resin (SPUR).

EXAMPLE 1

Preparation of Silane A

Silane A was prepared by the following method: 128.6 grams (0.55 moles) of N-ethyl-(3-diethoxymethylsilyl)-2-methylpropanamine, 74.1 grams (0.63 moles) of 2-methyl-2,4-pentanediol (74.1 g, 0.63 moles) and 4.6 grams (0.014 moles) of sodium ethoxide solution (21 wt. % in ethanol) were combined in a 250 mL round-bottom flask equipped with a 5-plate Oldershaw column, short-path distillation head, receiver flask, temperature probe and heating mantle. The flask was then heated to about 45° C. under vacuum at about 30 mmHg to remove ethanol. The vacuum was slowly increased to about 0.5 mmHg over a period of about 5 hours as the temperature was gradually increased to 95° C. Unreacted 2-methyl-2,4-pentanediol was stripped out at a pot temperature of 110 to 116° C. and head temperature of 55 to 75° C. at 0.5 mmHg. The product was distilled at a pot temperature of 110-116° C. and a head temperature of 82-84° C. to yield approximately 115.3 grams, an 80.1% theoretical yield, of Silane A.

EXAMPLE 2 AND COMPARATIVE EXAMPLE 1

Example 2 describes the preparation of a SPUR polymer using Silane A (Example 1) as an endcapper. Comparative Example 1, provided as a control, describes the preparation of a SPUR polymer using N-ethyl-(diethoxymethysilyl)-2-methylpropanamine as an endcapper. An NCO terminated prepolymer to be used in these examples was prepared using isophorone diisocyanate (IPDI).

Example 2 and Comparative Example 1 were independently prepared using the following method. In a reactor, the polyol component, in the amount indicated in Table 1, was dried by agitating and sparging with Nitrogen at 80° C. until the moisture content of the polyol was reduced to 200 ppm or less. Next, the reactor was cooled to about 45° C. IPDI was then added, in the amount indicated in Table 1, to the dried polyol component and mixed. After about five minutes, the catalyst, in the amount indicated in Table 1, was added to the resulting mixture of dried polyol and IPDI. Under continuous agitation, the resulting mixture of dried polyol, IPDI and catalyst was heated to about 75° C. The temperature was maintained at 75° C., and the NCO content was checked using the n-dibutylamine titration method every hour and a half until reaching the theoretical capping position. Next, the endcapper, as indicated in Table 1, was added to the mixture in the amount indicated in Table 1. The reaction proceeded at a temperature of 75° C. until completion of the reaction was determined by titration. The duration of the reaction lasted about 24 to about 28 hours.

TABLE 1

Formulation of Example 2 and Comparative Example 1

| Ingredients | Example 2 | Comparative Example 1 |
|---|---|---|
| Acclaim ® polyol 8200 (Available from Bayer) | 400 grams | 400 grams |
| Isophorone diisocyanate (IPDI) | 14.9 grams | 14.9 grams |
| Dibutylin Dilaurate (10% in DMM PPG) | 10 ppm | 12 ppm |
| Silane A (Example 1) | 9.0 grams | — |
| N-ethyl-(diethoxymethysilyl)-2-methylpropanamine | — | 7.1 grams |

The viscosity of Example 2 and Comparative Example 1 were determined. Independent samples were then prepared by casting 2.5 mm thick sheets of Example 2 and Comparative Example 1, respectively, with additional 1 weight percent of catalyst. To effectuate cure, the sheets were placed in a chamber at 90% humidity and 38° C. for 3 days. The sheets were then placed in an oven at 50° C. for an additional 4 days. After cure, "dog bone" samples were cut from the sheets, and the physical properties of the samples were determined, which are listed below in Table 2.

TABLE 2

Physical Properties of Example 2 and Comparative Example 1

| | Viscosity of the SPUR resin (cP) | Tensile Strength (psi) | Young's Modulus (psi) | Elongation percent | Hardness (SHORE A) |
|---|---|---|---|---|---|
| Example 2 | 345,000 | 95.3 | 47.9 | 557.1 | 13.3 |
| Comparative Example 1 | 185,000 | 76.9 | 47.9 | 450 | 9.5 |

EXAMPLE 3 AND COMPARATIVE EXAMPLE 2

Example 3 and Comparative Example 2 were prepared using the same procedures as described above in Example 2 and Comparative 1 using the ingredients and amounts indicated in Table 3. An NCO terminated preoplymer to be used in these examples was prepared using methylene diphenylene diisocyanate (MDI).

TABLE 3

Formulations of Example 3 and Comparative Example 2

| Ingredients | Example 3 | Comparative Example 2 |
|---|---|---|
| Acclaim ® polyol 4200 (Available from Bayer) | 400 grams | 400 grams |
| Methylene diphenylene diisocyanate (MDI) | 37.3 grams | 37.3 grams |
| Catalyst (Dibutyltin dilaurate, 10% in DMM PPG) | 4.5 ppm | 10 ppm |
| Silane A (Example 1) | 27.1 grams | — |
| N-ethyl-(3-diethoxymethylsilyl)-2-methylpropanamine | — | 21.4 grams |

The physical and mechanical properties are listed below in Table 4.

TABLE 4

Physical Properties of Example 3 and Comparative Example 2

| | Viscosity of the SPUR resin (cP) | Tensile Strength (psi) | Young's Modulus (psi) | Elongation percent | Hardness (SHORE A) |
|---|---|---|---|---|---|
| Example 3 | 192,000 | 120.0 | 157.6 | 123.1 | 29.0 |
| Comparative Example 2 | 180,600 | 129.1 | 184.2 | 134.1 | 26.3 |

These examples illustrate the preparation of organofunctional silanes (designated Silane B and C, respectively) which will later be used as adhesive promoters in sealant compositions.

EXAMPLE 4

Preparation of Silane B

Silane B was prepared by the following method: 2306 grams (10.4 moles) of 3-aminopropyltriethoxysilane, 936 grams (10.4 moles) of 2-methyl-1,3-propanediol and 13.95 grams (0.036 moles) of sodium ethoxide solution (21 wt. % in ethanol) were combined in a 5 L round-bottomed flask equipped with a magnetic stirrer, 12" vigreux column, short-path distillation head, receiver flask, temperature probe, and heating mantle. The flask was heated to 60° C. under vacuum at 120 mmHg to remove ethanol. The vacuum was gradually increased to 0.5 mmHg over 5 hours as the temperature was gradually increased to 85° C., while stripping out ethanol. Approximately 2221 grams of Silane B was recovered.

EXAMPLE 5

Preparation of Silane C

Silane C was prepared by the following method: 199.9 grams (1.05 moles) of 3-aminopropylmethyldiethoxysilane, 94.2 grams (1.05 moles) of 2-methyl-1,3-propanediol and 7.0 grams (0.02 moles) of sodium ethoxide solution (21 wt. % in ethanol) were combined in a 500 mL round-bottom flask equipped with a magnetic stirrer, 12" vigreux column, short-path distillation head, receiver flask, temperature probe, and heating mantle. The flask was heated to 60° C. under vacuum at 120 mmHg to remove ethanol. The vacuum was gradually increased to 0.5 mmHg over 5 hours as the temperature was gradually increased to 85° C., while stripping out ethanol. Approximately 197.2 grams of Silane C was recovered.

EXAMPLES 6-8

COMPARATIVE EXAMPLE 3

EXAMPLE 6

Preparation of Sealant Composition

Example 6 illustrates the preparation of a sealant composition. The sealant composition was prepared by mixing the ingredients in the amounts and mixing times as indicated in Table 5 below in a Ross PDM power mixer.

TABLE 5

Formulation of the Sealant Composition

| Mixing Step | Ingredients | Weight percent | Mixing Time |
|---|---|---|---|
| 1 | Silylated Polymer (Silquest ® Y15735, available from GE) | 23.08 | 30 minutes |
|  | Tinuvins 213, Stabilizer | 0.23 |  |
|  | Tinuvins 622L, Stabilizer | 0.23 |  |
| 2 (Added to resultant mixture of Step 1) | $SiO_2$ (Thixotropic agent) | 1.13 | 30 minutes |
| 3 (Added to resultant mixture of Step 2) | Calcium Carbonate (Ultra Pflex ®, available from Specialty Minerals) | 8.31 | 20 minutes |
|  | Calcium Carbonate (High Pflex ®, available from Specialty Minerals) | 5.54 |  |
| 4 (Added to resultant mixture of Step 3) | Diisodecyl Phthalate (DIDP, a plasticizer) | 9.23 | 20 minutes |
| 5 (Added to resultant mixture of Step 4) | Calcium Carbonate (Ultra Pflex ®, available from Specialty Minerals) | 16.62 | 20 minutes |
|  | Calcium Carbonate (High Pflex ®, available from Specialty Minerals) | 11.08 |  |
| 6 (Added to resultant mixture of Step 5) | Diisodecyl Phthalate (DIDP, plasticizer) | 9.23 | 20 minutes |
| 7 (Added to resultant mixture of Step 6) | Calcium Carbonate (Ultra Pflex ®, available from Specialty Minerals) | 8.31 | 1 hour 40 minutes |
|  | Calcium Carbonate (High Pflex ®, available from Specialty Minerals) | 5.54 |  |
|  | $TiO_2$ (Pigment) | 1.16 |  |

After thoroughly mixing the sealant composition, the sealant composition of Example 6 was divided into three equal portions to be used in the preparation of Examples 7 and 8 and Comparative Example 3, respectively.

EXAMPLES 7 AND 8

COMPARATIVE EXAMPLE 3

Examples 7 and 8 describe the preparation of physical mixtures including Example 4 and Example 5, respectively, a catalyst and the sealant composition of Example 6. Comparative Example 3, provided as a control, describes the preparation of a physical mixture including 3-aminopropyltriethoxysilane, a catalyst and the sealant composition of Example 6.

The physical mixtures were prepared by the following method: The sealant composition of Example 6 and silane were charged to a Flack Tek® speed mixer in the amounts indicated in Table 6 and mix for about one to two minutes at 2000 rpm. Next, the catalyst was added in the amount indicated in Table 6 to the resulting mixture and mixed for about one minute at 2000 rpm.

TABLE 6

Composition of Physical Mixtures

| Ingredients | Example 7 (weight percent) | Example 8 (weight percent) | Comparative Example 3 (weight percent) |
|---|---|---|---|
| Silane B (Example 4) | 0.57 | — | — |
| Silane C (Example 5) | — | 0.57 | — |
| 3-aminopropyltriethoxy silane, Sliquest ® A-1110 available from GE Advanced Materials | — | — | 0.57 |
| Sealant Composition (Example 6) | 99.4 | 99.4 | 99.4 |
| Dibutylin Dilaurate, Catalyst | 0.3 | 0.3 | 0.3 |

EXAMPLES 9-10

COMPARATIVE EXAMPLE 4

These examples illustrate the curing of the physical mixtures of Examples 7-8 and Comparative Example 3, supra.

A portion of the physical mixtures of Examples 7-8 and Comparative Example 3 were independently formed into 2.5 mm sheets. To effect curing of the physical mixtures, the sheets were placed in a high humidity chamber for three days at 90 percent humidity and 38° C. The sheets were then placed in an oven at 50° C. for 4 days After curing, samples were stamped out of the cured sheets using a clicker press and die. Tensile, elongation and modulus at break were determined according to ASTM D412 for all samples. The physical and mechanical properties of the cured samples are listed in Table 7 below.

TABLE 7

Physical Properties of Cured Physical Mixtures

|   | Adhesion Promoter | Tensile Strength (psi) | Young's Modulus (psi) | 100% Modulus (psi) | Elongation (percent) | Tear Resistance (Lb/in) | Hardness (Shore A) |
|---|---|---|---|---|---|---|---|
| Example | | | | | | | |
| 9 | Ex. 4 | 164.5 | 120.4 | 80.3 | 342.0 | 23.1 | 21.0 |
| 10 | Ex. 5 | 152.0 | 114.9 | 80.5 | 433.3 | 26.2 | 26.0 |
| Comparative Example | | | | | | | |
| 3 | 3-aminopropyltriethoxy silane | 175.9 | 62.0 | 57.2 | 626.4 | 40.4 | 22.0 |

Additional samples were prepared by placing the remaining portion of the physical mixtures on glass, aluminum and PVC substrates. To effectuate cure of the samples, the substrates with the physical mixtures thereon were initially placed in a high humidity chamber at 90 percent humidity and 38° C. for 3 days. The substrates were then placed in a low humidity chamber at 50 percent humidity and 23° C. for 4 days. Next, the substrates were placed in a water bath at 23° C. for 7 days. After curing, the peel strength of all samples were determined. The physical and mechanical properties of the cured samples are listed in Table 8 below.

EXAMPLES 11 AND 12

Examples 11 and 12 were prepared using the same formulations and preparations of the sealant as described in Examples 6-8 except the silylated polyurethane propolymer used was WSP 725-80 available from Witton Chemicals and the adhesion promoters used were Silquest® Y-15656 and Silquest® Y-15686, respectively, both of which are available from GE Advanced Materials.

TABLE 8

Peel Strength of Cured Samples

|   | Example 9 | | Example 10 | | Comparative 4 | |
|---|---|---|---|---|---|---|
| Substrate | Avg. Peel Strength (lbs/in) | Failure Type | Avg. Peel Strength (lbs/in) | Failure Type | Avg. Peel Strength (lbs/in) | Failure Type |
| Aluminum | 18.0 | 100% Cohesive | 11.9 | 90% Cohesive | 17.6 | 100% Cohesive |
| Glass | 25.6 | 100% Cohesive | 6.4 | 40% Cohesive | 11.5 | 100% Cohesive |
| PVC | 17.1 | 100% Cohesive | 12.7 | 100% Cohesive | 15.7 | 100% Cohesive |

In addition, the test procedures described in Examples 9-10 were employed here. The results of the test are listed in Table 9 below.

TABLE 9

| Example | Adhesion Promoter | Tensile Strength (psi) | 100% Modulus (psi) | Elongation (percent) | Peel Strength (lb/in) | | |
|---|---|---|---|---|---|---|---|
| | | | | | Aluminum | Glass | PMMA |
| 11 | Silquest ® Y-15656 | 188.5 | 39.2 | 890 | 29.7 | 33.3 | 18.3 |
| 12 | Silquest ® Y-15686 | 187.1 | 36.3 | 844 | 38.0 | 36.8 | 22.6 |

* All tests resulted in 80–100% cohesive failure

In general, the silanes of the present invention show equivalent or improved performance as compared to currently employed silanes, and offer a significant benefit per the reduction in the amount of volatile organic compounds that are released.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A crosslinkable silane-terminated polymer which comprises the reaction product of an isocyanate-terminated prepolymer and a silane possessing a plurality of hydrolyzable sites and at least one active hydrogen-containing group which is reactive for isocyanate, the silane upon hydrolysis producing a reduced amount of volatile organic compound compared to that produced by the hydrolysis of a silane possessing an equivalent number of hydrolyzable sites all of which are hydrolyzable alkoxy groups.

2. The crosslinkable silane-terminated polymer of claim 1 wherein the isocyanate-terminated prepolymer is the reaction product of a polyisocyanate and a polyol.

3. The crosslinkable silane-terminated polymer of claim 2 wherein the polyisocyanate is selected from the group consisting of aliphatic, cycloaliphatic, araliphatic and aromatic organic diisocyanate.

4. The crosslinkable silane-terminated polymer of claim 2 wherein the polyol has a molecular weight in the range of 1,000 to 20,000.

5. The crosslinkable silane-terminated polymer of claim 2 wherein the polyol is selected from the group consisting of diols, triols, polyester polyols, polyether polyols, and any combination thereof.

6. The crosslinkable silane-terminated polymer of claim 1 wherein the silane has the general formula:

$$[Y[\text{-}G(\text{-}SiX_uZ^b_vZ^c_w)_s]_r]_n \quad \text{(Formula 1)}$$

wherein each occurrence of G is independently chosen from a set of groups comprising a polyvalent group derived by substitution of one or more hydrogen atoms of an alkyl, alkenyl, aryl or aralkyl group, and a polyvalent group derived by substitution of one or more hydrogen atoms of a heterocarbon, with G containing from about 1 to about 30 carbon atoms; each occurrence of X is independently selected from the group consisting of —Cl, —Br, $R^1O$—, $R^1C(=O)O$—, $R^1R^2C=NO$—, $R^1R^2NO$— or $R^1R^2N$—, —$R^1$, —$(OSiR^1R^2)_t(OSi\ R^1R^2R^3)$, and —$O(R^{10}CR^{11})_f OH$, wherein each occurrence of $R^1$, $R^2$, $R^3$, $R^{10}$ and $R^{11}$ is independently R; each occurrence of $Z^b$ is independently selected from the group consisting of (—O—)$_{0.5}$, [—O($R^{10}CR^{11}$)$_f$O—]$_{0.5}$, [—HN($R^{10}CR^{11}$)$_f$N(H)—]$_{0.5}$, [—OOC($R^{10}CR^{11}$)$_f$COO—]$_{0.5}$, [—O($R^{10}CR^{11}$)$_f$N(H)—]$_{0.5}$ and [—O($R^{10}CR^{11}$)$_f$COO—]$^{0.5}$, wherein each occurrence of $R^{10}$ and $R^{11}$ is independently R; each occurrence of $Z^c$ is independently selected from the group consisting of —O($R^{10}CR^{11}$)$_f$O—, —HN($R^{10}CR^{11}$)$_f$N(H)—, —OOC($R^{10}CR^{11}$)$_f$COO—, —O($R^{10}CR^{11}$)$_f$N(H)— and —O($R^{10}CR^{11}$)$_f$COO—, wherein each occurrence of $R^{10}$ and $R^{11}$ is independently R; each occurrence of R is chosen independently from the set of groups comprising hydrogen, straight, cyclic or branched alkyl groups alkenyl groups, aryl groups and aralkyl groups, and molecular components obtained by removal of one or more hydrogen atoms of a heterocarbon, wherein each occurrence of R contains from 1 to about 20 carbon atoms; each occurrence of the subscript f is an integer from 1 to about 15; each occurrence of n is an integer from 1 to about 100, with the proviso that when n is greater than 1, v is greater than 0 and all the valences for $Z^b$ have a silicon atom bonded to them; each occurrence of the subscript u is an integer from 0 to about 3; each occurrence of the subscript v is an integer from 0 to about 3; each occurrence of the subscript w is an integer from 0 to about 1, with the proviso that u+v+2w=3; each occurrence of the subscript r is an integer from 1 to about 6; each occurrence of the subscript t is an integer from 0 to about 50; each occurrence of the subscript s is an integer from 1 to about 6; each occurrence of Y is an organofunctional group of valence r; wherein said cross-linkable silane terminated polymer contains at least one occurrence of [—O($R^{10}CR^{11}$)$_f$O—]$_{0.5}$, [—HN($R^{10}CR^{11}$)$_f$N(H)—]$_{0.5}$, [—OOC($R^{10}CR^{11}$)$_f$COO—]$_{0.5}$, [—O($R^{10}CR^{11}$)$_f$N(H)—]$_{0.5}$, [—O($R^{10}CR^{11}$)$_f$COO—]$_{0.5}$, or $Z^c$.

7. The crosslinkable silane-terminated polymer of claim 6 wherein Y is selected from the group consisting of a univalent organofunctional group, a divalent organofunctional group, a trivalent organofunctional group, a tetravalent organofunctional group and a polyvalent organofunctional group.

8. The crosslinkable silane-terminated polymer of claim 7 wherein the univalent organofunctional group is selected from the group consisting of $CH_2=CH$—, $CHR=CH$—, $CR_2=CH$—, mercapto, acryloxy, methacryloxy, acetoxy, —O—$CH_2$—$C_2H_3O$, —$CH_2$—$CH_2$—$C_6H_9O$, —$C_6H_9O$, —$CR^6(-O-)CR^4R^5$, —OH, —$NR^4C(=O)OR^5$, —OC($=O$)$NR^4R^5$, —$NR^4C(=O)SR^5$, —$SC(=O)NR^4R^5$, —$NR^4C(=S)OR^5$, —OC($=S$)$NR^4R^5$, —$NR^4C(=S)SR^5$, —$SC(=S)NR^4R^5$, maleimide, maleate, substituted maleate, fumarate, substituted fumarate, —CN, citraconimide, —OCN, —N=C=O, —SCN, —N=C=S, —$OR^4$, —F, —Cl, —Br, —I, —$SR^4$, —S—$SR^4$, —S—S—$SR^4$, —S—S—S—$SR^4$, —S—S—S—S—$SR^4$, —S—S—S—S—$SR^4$, —$S_xR^4$, —SC($=S$)$OR^4$, —SC($=S$)$SR^4$, —SC($=O$)$SR^4$, —$NR^4C(=O)NR^5R^6$, —$NR^4C(=S)NR^5R^6$, —$NR^4C(=S)NR^5R^6$, $R^4C(=O)NR^5$—, —C($=O$)$NR^4R^5$—, $R^4C(=S)NR^4$—, melamine, cyanurato, —$NH_2$, —$NHR^4$, —$NR^4R^5$, —$NR^4$-$L^1$-$NR^5R^6$, —$NR^4$-$L^1(-NR^5R^6)_2$, —$NR^4$-$L^1$-$NR^5$-$L^2$-$NR^6R^7$, —$NR^4$-$L^1$(-$NR^5R^6$)$_3$, —$NR^4$-$L^1$-$NR^5$-$L^2$-$NR^6$-$L^3$-$NR^7R^8$ and —$NR^4$-$L^1$-N(-$L^2NR^5R^6$)$_2$; the divalent organofunctional group is selected from the group consisting of -(-)C (—O—)$CR^4R^5$, —$CR^5$(—O—)$CR^4$—, —O($R^{10}CR^{11}$)$_f$O—, -(-)NC($=O$)$OR^5$, —OC($=O$)$NR^4$—, -(-)NC($=O$)$SR^5$, —SC($=O$)$NR^4$—, -(-)NC($=S$)$OR^5$, —OC($=S$)$NR^4$—, -(-)NC($=S$)$SR^5$, -SC($=S$)$NR^4$—, —O—, maleate, substituted maleate, fumarate, substituted fumarate, —S—, —S—S—, —S—S—S—, —S—S—S—S—, —S—S—S—S—S—, —S—S—S—, —$S_x$—, —SC($=S$)O—, —SC($=S$)S—, —SC($=O$)S—, -(-)NC($=O$)$NR^4R^5$, —$NR^4C(=O)NR^5$—, -(-) NC($=S$)$NR^4R^5$, —$NR^4C(=S)NR^5$—, $R^4C(=O)N(-)$-, —C($=O$)$NR^4$—, $R^4C(=S)N(-)$-, divalent melamine, divalent cyanurato, —NH——$NR^4$—, -(-)N-$L^1$-$NR^4R^5$, —$NR^4$-$L^1$-$NR^5$—, (-)$NR^4$)$_2$-$L^1$-$NR^5R^6$, -(-)N-$L^1$-$NR^5$-$L^2$-$NR^6R^7$, —$NR^4$-$L^1$-N(-)-$L^2$-$NR^5R^6$, —$NR^4$-$L^1$-$NR^5$-$L^2$-$NR^6$—, -(-) N-$L^1$-(-$NR^5R^6$)$_3$, (—$NR^4$)$_2$-$L^1$-(-$NR^5R^6$)$_2$, -(-)N-$L^1$-$NR^4$-$L^2$-$NR^5$-$L^3$-$NR^6R^7$, —$NR^4$-$L^1$-N(-)-$L^2$-$NR^5$-$L^3$-$NR^6R^7$, —$NR^4$-$L^1$-$NR^5$-$L^2$-N(-)-$L^3$-$NR^6R^7$, —$NR^4$-$L^1$-$NR^5$-$L^2$-$NR^6$-$L^3$-$NR^7$—, -(-)N-$L^1$-N(-$L^2NR^5R^6$)$_2$ and (—$NR^4L^1$-)$_2$N-$L^2NR^5R^6$;

the trivalent organofunctional group is selected from the group consisting of -(-)C (—O—)$CR^4$—, -(-)NC($=O$)O—, -(-)NC($=O$)S—, -(-)NC($=S$)O—, -(-)NC($=S$)S—, -(-) NC($=O$)$NR^4$—, -(-)NC($=S$)$NR^4$—, —C($=O$)N(-)-, —C($=S$)N(-)-, trivalent melamino; trivalent cyanurato, —N(-)-, -(-)N-$L^1$-$NR^4$—, (—$NR^4$)$_3$-$L^1$, (—$NR^4$)$_2$-$L^1$-$NR^5$—, -(-)N-$L^1$-N(-)-$L^2$-$NR^3R^4$, —$NR^4$-$L^1$-N(-)-$L^2$-$NR^5$—, -(-)N-$L^1$-$NR^4$-$L^2$-

NR$^5$—, -(-)N-L$^1$-N(-)-L$^2$-NR$^5$-L$^3$-NR$^3$R$^4$, —NR$^4$-L$^1$-N(-)-L$^2$-N(-)-L$^3$-NR$^3$R$^4$, -(-)N-L$^1$-NR$^5$-L$^2$-N(-)-L$^3$-NR$^3$R$^4$, —NR$^4$-L$^1$-N(-)-L$^2$-NR$^3$-L$^3$-NR$^4$—, -(-)N-L$^1$-N(-L$^2$NR$^3$R$^4$)(-L$^2$NR$^5$—) and (—NR$^4$L$^1$-)$_3$N;

the tetravalent organofunctional group is selected from the group consisting of -(-)C(—O—)C(-)-, -(-)NC(=O)N(-)-, -(-)NC(=S)N(-)-, tetravalent melamino, -(-)N-L$^1$-N(-)- ,(—NR$^4$)$_4$-L$^1$, (—NR$^4$)$_2$-L$^1$-N(-)-, -(-)N-L$^1$-N(-)-L$^2$-NR$^3$—, -(-) N-L$^1$-NR$^4$-L$^2$(-)-, -(-)N-L$^1$-N(-)-L$^2$-N(-)-L$^3$-NR$^4$R$^3$, —NR$^4$-L$^1$-N(-)-L$^2$-N(-)-L$^3$-NR$^3$—, -(-)N-L$^1$-NR$^4$-L$^2$-NR$^4$-L$^2$-NR$^3$-L$^3$-N(-)- and -(-)N-L$^1$-N(-L$^2$NR$^3$—)$_2$; and, the polyvalent organofunctional group is selected from the group consisting of polyvalent hydrocarbon groups, (—NR$^3$)(—N—)$_2$C$_3$N$_3$, (—N—)$_3$C$_3$N$_3$, -(-)N-L$^1$-N(-)-L$^2$-N(-)-, -(-)N-L$^1$-N(-)-L$^2$-N(-)-L$^3$-NR$^3$—, -(-) N-L$^1$-NR$^3$-L$^2$-N(-)-L$^3$-N(-)-, [-(-)N-L$^1$-]$_2$N-L$^2$NR$^3$—, -(-)N-L$^1$-N(-)-L$^2$-N(-)-L$^3$-N(-)- and [-(-)N-L$^1$-]$_3$, wherein each occurrence of L$^1$, L$^2$, and L$^3$ is selected independently from the set of structures given above for G; each occurrence of R is independently given by one of the structures listed above for R, R$^1$, R$^2$, R$^3$, R$^4$, R$^5$, R$^6$, R$^7$, R$^8$, R$^{10}$ and R$^{11}$ is chosen independently from the set of groups comprising hydrogen, straight, cyclic or branched alkyl groups, alkenyl groups, aryl groups and aralkyl groups, and molecular components obtained by removal of one or more hydrogen atoms of a heterocarbon, wherein each occurrence of R, R$^1$, R$^2$, R$^3$, R$^4$, R$^5$, R$^6$, R$^7$, R$^8$, R$^{10}$ and R$^{11}$ contains from 1 to about 20 carbon atoms, and x is independently an integer from 7 to 10.

9. The crosslinkable silane-terminated polymer of claim 6 wherein G is selected from the group consisting of diethylene cyclohexane, 1,2,4-triethylene cyclohexane, diethylene benzene, phenylene,—(CH$_2$)$_m$-wherein m is 1 to 12 and CH$_2$(CH$_2$)$_q$CH(CH$_3$)— wherein q is zero to 17.

10. The crosslinkable silane-terminated polymer of claim 6 wherein each R. R$^1$, R$^2$, R$^3$, R$^4$, R$^5$, R$^6$, R$^7$, R$^8$, R$^{10}$ and R$^{11}$ is independently selected from the group consisting of methyl, ethyl, propyl, isopropyl, octenyl, cyclohexyl, butyl, phenyl, benzyl, tolyl, allyl, methoxyethyl, ethoxyethyl, dimethylaminoethyl and cyanoethyl.

11. The crosslinkable silane-terminated polymer of claim 6 wherein R$^{10}$ and R$^{11}$ are each independently selected from a group consisting of hydrogen, methyl and ethyl.

12. The crosslinkable silane-terminated polymer of claim 6 wherein R$^1$ and R$^2$ are independently selected from the group consisting of hydrogen, methyl, ethyl and propyl.

13. The crosslinkable silane-terminated polymer of claim 6 wherein R$^3$, R$^4$, R$^5$, R$^6$, R$^7$ and R$^8$ are independently selected from the group consisting of phenyl, methyl, butyl, H and ethyl.

14. The crosslinkable silane-terminated polymer of claim 6 wherein X is selected from the group consisting of methoxy, ethoxy, isobutoxy, propoxy, isopropoxy, acetoxy, methoxyethoxy, oximato and monovalent alkoxy groups derived from diols.

15. The crosslinkable silane-terminated polymer of claim 6 wherein v is 0, X is R$^1$O— or R$^1$C(=O)—, wherein R$^1$ is an alkyl of C$_1$ to C$_4$ or hydrogen, and G is a divalent straight chain alkylene of 2 to 18 carbon atoms.

16. The crosslinkable silane-terminated polymer of claim 1 admixed with a catalyst in an amount sufficient to cure said polymer upon exposure to moisture thereby forming a moisture curable silane-terminated polymer.

17. The cured composition of claim 6.

18. A moisture-curable sealant composition which comprises the moisture curable silane-terminated polymer claimed in claim 16 in combination with at least one filler.

19. A cured sealant according to claim 18.

20. An adhesive or coating composition which comprises the crosslinkable silane-terminated polymer of claim 1.

21. A sealant composition which comprises a silylated polyurethane resin, a catalyst and an adhesion promoting silane, the silane which upon hydrolysis produces a reduced amount of volatile organic compound compared to that produced by the hydrolysis of a silane possessing an equivalent number of hydrolyzable sites all of which are hydrolyzable alkoxy groups.

22. The sealant composition of claim 21 wherein the silane has the general formula:

$$[Y[-G(-SiX_u Z^b_v Z^c_w)_s]_r]_n \quad \text{(Formula 1)}$$

wherein each occurrence of G is independently chosen from a set of groups comprising a polyvalent group derived by substitution of one or more hydrogen atoms of an alkyl, alkenyl, aryl or aralkyl group, and a polyvalent group derived by substitution of one or more hydrogen atoms of a heterocarbon, with G containing from about 1 to about 30 carbon atoms; each occurrence of X is independently selected from the group consisting of —Cl, —Br, R$^1$O—, R$^1$C(=O)O—, R$^1$R$^2$C=NO—, R$^1$R$^2$NO— or R$^1$R$^2$N—, —R$^1$, —(OSiR$^1$R$^2$)$_t$(OSi R$^1$R$^2$R$^3$), and —O(R$^{10}$CR$^{11}$)$_f$OH, wherein each occurrence of R$^1$, R$^2$, R$^3$, R$^{10}$ and R$^{11}$ is independently R; each occurrence of Z$^b$ is independently selected from the group consisting of (—O—)$_{0.5}$, [—O(R$^{10}$CR$^{11}$)$_f$O—]$_{0.5}$, [—HN(R$^{10}$CR$^{11}$)$_f$N(H)—]$_{0.5}$, [—OOC(R$^{10}$CR$^{11}$)$_f$COO—]$_{0.5}$, [—O(R$^{10}$CR$^{11}$)$_f$N(H)—]$_{0.5}$ and [—O(R$^{10}$CR$^{11}$)$_f$COO—]$_{0.5}$, wherein each occurrence of R$^{10}$ and R$^{11}$ is independently R; each occurrence of Z$^c$ is independently selected from the group consisting of —O(R$^{10}$CR$^{11}$)$_f$O—, —HN(R$^{10}$CR$^{11}$)$_f$N(H)—, —OOC(R$^{10}$CR$^{11}$)$_f$COO—, —O(R$^{10}$CR$^{11}$)$_f$N(H)— and —O(R$^{10}$CR$^{11}$)$_f$COO—, wherein each occurrence of R$^{10}$ and R$^{11}$ is independently R; each occurrence of R is chosen independently from the set of groups comprising hydrogen, straight, cyclic or branched alkyl groups alkenyl groups, aryl groups and aralkyl groups, and molecular components obtained by removal of one or more hydrogen atoms of a heterocarbon, wherein each occurrence of R contains from 1 to about 20 carbon atoms; each occurrence of the subscript f is an integer from 1 to about 15; each occurrence of n is an integer from 1 to about 100, with the proviso that when n is greater than 1, v is greater than 0 and all the valences for Z$^b$ have a silicon atom bonded to them; each occurrence of the subscript u is an integer from 0 to about 3; each occurrence of the subscript v is an integer from 0 to about 3; each occurrence of the subscript w is an integer from 0 to about 1, with the proviso that u+v+2w=3; each occurrence of the subscript r is an integer from 1 to about 6; each occurrence of the subscript t is an integer from 0 to about 50; each occurrence of the subscript s is an integer from 1 to about 6; each occurrence of Y is an organofunctional group of valence r; wherein said cross-linkable silane terminated polymer contains at least one occurrence of [—O(R$^{10}$CR$^{11}$)$_f$O—]$_{0.5}$, [—HN(R$^{10}$CR$^{11}$)$_f$N(H)—]$_{0.5}$, [—OOC(R$^{10}$CR$^{11}$)$_f$COO—]$_{0.5}$, [—O(R$^{10}$CR$^{11}$)$_f$N(H)—]$_{0.5}$, [—O(R$^{10}$CR$^{11}$)$_f$COO—]$_{0.5}$, or Z$^C$.

23. The sealant composition of claim 22 wherein Y is selected from the group consisting of a univalent organofunctional group, a divalent organofunctional group, a trivalent organofunctional group, a tetravalent organofunctional group and a polyvalent organofunctional group.

24. The sealant composition of claim 23 wherein the univalent organofunctional group is selected from the group consisting of $CH_2$=CH—, CHR=CH—, $CR_2$=CH—, mercapto, acryloxy, methacryloxy, acetoxy, —O—$CH_2$—$C_2H_3O$, —$CH_2$—$CH_2$—$C_6H_9O$, —$C_6H_9O$, —$CR^6$(—O—)$CR^4R^5$, —OH, —$NR^4C$(=O)$OR^5$, —OC(=O)$NR^4R^5$, —$NR^4C$(=O)$SR^5$, —SC(=O)$NR^4R^5$, —$NR^4C$(=S)$OR^5$, —OC(=S)$NR^4R^5$, —$NR^4C$(=S)$SR^5$, —SC(=S)$NR^4R^5$, maleimide, maleate, substituted maleate, fumarate, substituted fumarate, —CN, citraconimide, —OCN, —N=C=O, —SCN, —N=C=S, —$OR^4$, —F, —Cl, —Br; —I, —$SR^4$, —S—$SR^4$, —S—S—$SR^4$, —S—S—S—$SR^4$, —S—S—S—S—$SR^4$, —S—S—S—S—S—$SR^4$, —$S_xR^4$, —SC(=S)$OR^4$, —SC(=S)$SR^4$, —SC(=O)$SR^4$, —$NR^4C$(=O)$NR^5R^6$, —$NR^4C$(=S)$NR^5R^6$, $R^4C$(=O)$NR^5$—, —C(=O)$NR^4R^5$—, $R^4C$(=S)$NR^4$—, melamine, cyanurato, —$NH_2$, —$NHR^4$, —$NR^4R^5$, —$NR^4$-$L^1$-$NR^5R^6$, —$NR^4$-$L^1$(-$NR^5R^6$)$_2$, —$NR^4$-$L^1$-$NR^5$-$L^2$-$NR^6R^7$, —$NR^4$-$L^1$(-$NR^5R^6$)$_3$, —$NR^4$-$L^1$-$NR^5$-$L^2$-$NR^6$-$L^3$-$NR^7R^8$ and —$NR^4$-$L^1$-N(-$L^2NR^5R^6$)$_2$; the divalent organofunctional group is selected from the group consisting of -(-)C (—O—)$CR^4R^5$, —$CR^5$(—O—)$CR^4$—, —O($R^{10}CR^{11}$)$_p$O—, -(-) NC(=O)$OR^5$, —OC(=O)$NR^4$—, -(-) NC(=O)$SR^5$, —SC(=O)$NR^4$—, -(-)NC(=S)$OR^5$, —OC(=S)$NR^4$—, -(-)NC(=S)$SR^5$, —SC(=S)$NR^4$—, —O—, maleate, substituted maleate, fumarate, substituted fumarate, —S—, —S—S—, —S—S—S—, —S—S—S—S—, —S—S—S—S—S—, —S—S—S—S—S—S—, —$S_x$—, —SC(=S)O—, —SC(=S)S—, —SC(=O)S—, -(-)NC(=O)$NR^4R^5$, —$NR^4C$(=O)$NR^5$—, -(-)NC(=S)$NR^4R^5$, —$NR^4C$(=S)$NR^5$—, $R^4C$(=O)N(-)-, —C(=O)$NR^4$—, $R^4C$(=S)N(-)-, divalent melamine, divalent cyanurato, —NH—, —$NR^4$—, -(-)N-$L^1$-$NR^4R^5$, —$NR^4$-$L^1$-$NR^5$—, (-)$NR^4$)$_2$-$L^1$-$NR^5R^6$, -(-)N-$L^1$-$NR^5$-$L^2$-$NR^6R^7$, —$NR^4$-$L^1$-N(-)-$L^2$-$NR^5R^6$, —$NR^4$-$L^1$-$NR^5$-$L^2$-$NR^6$—, -(-)N-$L^1$-($N^5R^6$)$_3$, (—$NR^4$)$_2$-$L^1$-(N$R^5R^6$)$_2$)-(-)N-$L^1$-$NR^4$-$L^2$-$NR^5$-$L^3$-$NR^6R^7$, —$NR^4$-$L^1$-N(-)-$L^2$-$NR^5$-$L^3$-$NR^6R^7$, —$NR^4$-$L^1$-$NR^5$-$L^2$-N(-)-$L^3$-$NR^6R^7$, —$NR^4$-$L^1$-$NR^5$-$L^2$-$NR^6$-$L^3$-$NR^7$—, -(-)N-L₁-N(-$L^2NR^5R^6$)$_2$ and (—$NR^4L^1$-)$_2$N-$L^2NR^5R^6$;

the trivalent organofunctional group is selected from the group consisting of -(-)C (—O—)$CR^4$—, -(-)NC(=O)O—, -(-)NC(=O)S—, -(-)NC(=S)O—, -(-)NC(=S)S—, -(-) NC(=O)$NR^4$—, -(-)NC(=S)$NR^4$—, —C(=O)N(-)-, —C(=S)N(-)-, trivalent melamino; trivalent cyanurato, —N(-)-, -(-)N-$L^1$-$NR^4$—, (—$NR^4$)$_3$-$L^1$, (—$NR^4$)$_2$-$L^1$-$NR^5$—, -(-)N-$L^1$-N(-)-$L^2$-$NR^3R^4$, —$NR^4$-$L^1$-N(-)-$L^2$-$NR^5$—, -(-)N-$L^1$-$NR^4$-$L^2$-$NR^5$—, -(-)N-$L^1$-N(-)-$L^2$-$NR^5$-$L^3$-$NR^3R^4$, —$NR^4$-$L^1$-N(-)-$L^2$-N(-)-$L^3$-$NR^3R^4$, -(-)N-$L^1$-$NR^5$-$L^2$-N(-)-$L^3$-$NR^3R^4$, —$NR^4$-$L^1$-N(-)-$L^2$-$NR^3$-$L^3$-$NR^4$—, -(-)N-$L^1$-N(-$L^2NR^3R^4$)(-$L^2NR^5$—) and (—$NR^4L^1$-)$_3$N;

the tetravalent organofunctional group is selected from the group consisting of -(-)C(—O—)C(-)-, -(-)NC(=O)N(-)-, -(-)NC(=S)N(-)-, tetravalent melamino, -(-)N-$L^1$-N(-)-, (—$NR^4$)$_4$-$L^1$, (—$NR^4$)$_2$-$L^1$-N(-)-, -(-)N-$L^1$-N(-)-$L^2$-$NR^3$—, -(-)N-$L^1$-$NR^4$-$L^2$(-)-, -(-)N-$L^1$-N(-)-$L^2$-N(-)-$L^3$-$NR^4R^3$, —$NR^4$-$L^1$-N(-)-$L^2$-N(-)-$L^3$-$NR^3$—, -(-)N-$L^1$-$NR^4$-$L^2$-$NR^3$-$L^3$-N(-) and -(-)N-$L^1$-N(-$L^2NR^3$—)$_2$; and, the polyvalent organofunctional group is selected from the group consisting of polyvalent hydrocarbon groups, (—$NR^3$)(—N—)$_2C_3N_3$, (—N—)$_3C_3N_3$, -(-)N-$L^1$-N(-)-$L^2$-N(-)-, -(-)N-$L^1$-N(-)-$L^2$-N(-)-$L^3$-$NR^3$—, -(-)N-$L^1$-$NR^3$-$L^2$-N(-)-$L^3$-N(-)-, [-(-)N-$L^1$-]$_2$N-$L^2NR^3$—, -(-)N-$L^1$-N(-)-$L^2$-N(-)-$L^3$-N(-)- and [-(-)N-$L^1$-]$_3$, wherein each occurrence of $L^1$, $L^2$, and $L^3$ is selected independently from the set of structures given above for G; each occurrence of R is independently given by one of the structures listed above for R, $R^1$, $R^2$, $R^3$, $R^4$, $R^5$, $R^6$, $R^7$, $R^8$, $R^{10}$ and $R^{11}$ is chosen independently from the set of groups comprising hydrogen, straight, cyclic or branched alkyl groups, alkenyl groups, aryl groups and aralkyl groups, and molecular components obtained by removal of one or more hydrogen atoms of a heterocarbon, wherein each occurrence of R, $R^1$, $R^2$, $R^3$, $R^4$, $R^5$, $R^6$, $R^7$, $R^8$, $R^{10}$ and $R^{11}$ contains from 1 to about 20 carbon atoms, and x is independently an integer from 7 to 10.

25. The sealant composition of claim 22 wherein G is selected from the group consisting of diethylene cyclohexane, 1,2,4-triethylene cyclohexane, diethylene benzene, phenylene, —$(CH_2)_m$— wherein m is 1 to 12 and $CH_2(CH_2)_qCH(CH_3)$— wherein q is zero to 17.

26. The sealant composition of claim 22 wherein each R, $R^1$, $R^2$, $R^3$, $R^4$, $R^5$, $R^6$, $R^7$, $R^8$, $R^{10}$ and $R^{11}$ is independently selected from the group consisting of methyl, ethyl, propyl, isopropyl, octenyl, cyclohexyl, butyl, phenyl, benzyl, tolyl, allyl, methoxyethyl, ethoxyethyl, dimethylaminoethyl and cyanoethyl.

27. The sealant composition of claim 22 wherein $R^{10}$ and $R^{11}$ are each independently selected from a group consisting of hydrogen, methyl and ethyl.

28. The sealant composition of claim 22 wherein $R^1$ and $R^2$ are independently selected from the group consisting of hydrogen, methyl, ethyl and propyl.

29. The sealant composition of claim 22 wherein $R^3$, $R^4$, $R^5$, $R^6$, $R^7$ and $R^8$ are independently selected from the group consisting of phenyl, methyl, butyl, hydrogen and ethyl.

30. The sealant composition of claim 22 wherein X is selected from the group consisting of methoxy, ethoxy, isobutoxy, propoxy, isopropoxy, acetoxy, methoxyethoxy, oximato and monovalent alkoxy groups derived from diols.

31. The sealant composition of claim 22 wherein v is 0, X is $R^1O$— or $R^1C$(=O)—, wherein $R^1$ is an alkyl of $C_1$ to $C_4$ or hydrogen, and G is a divalent straight chain alkylene of 2 to 18 carbon atoms.

32. The sealant composition of claim 21 wherein the silane adhesion promoter is present in the range of about 0.25 to about 5 weight percent of the sealant composition.

33. The sealant composition of claim 21 wherein the catalyst in an amount sufficient to cure said composition upon exposure to moisture.

34. The sealant composition of claim 33 wherein the catalyst is a metal catalyst selected from the group consisting of tin or titanium compounds.

35. A cured sealant according to claim 33.

36. The sealant composition of claim 21 which further comprises one or more ingredients selected from the group consisting of thixotropic agent, plasticizer, stabilizer, pigment and filler.

* * * * *